United States Patent
Egelin, Jr. et al.

(10) Patent No.: US 10,573,195 B1
(45) Date of Patent: Feb. 25, 2020

(54) PILOT AND BURNER SYSTEM FOR FIREFIGHTING TRAINING

(71) Applicant: FIREBLAST GLOBAL, INC., Corona, CA (US)

(72) Inventors: Richard Wayne Egelin, Jr., Norco, CA (US); Christopher Charles Yirsa, Corona, CA (US)

(73) Assignee: FIREBLAST GLOBAL, INC., Corona, CA (US)

(*) Notice: Subject to any disclaimer, the term of this patent is extended or adjusted under 35 U.S.C. 154(b) by 417 days.

(21) Appl. No.: 15/406,497

(22) Filed: Jan. 13, 2017

Related U.S. Application Data

(63) Continuation of application No. 14/925,341, filed on Oct. 28, 2015, now Pat. No. 9,548,004.

(60) Provisional application No. 62/148,439, filed on Apr. 16, 2015.

(51) Int. Cl.
| | | |
|---|---|---|
| *G09B 9/00* | (2006.01) | |
| *F23D 99/00* | (2010.01) | |
| *F23Q 9/00* | (2006.01) | |
| *G09B 19/00* | (2006.01) | |

(52) U.S. Cl.
CPC ............... *G09B 9/00* (2013.01); *F23D 91/00* (2015.07); *F23Q 9/00* (2013.01); *G09B 19/00* (2013.01)

(58) Field of Classification Search
CPC .. G09B 9/00; G09B 19/00; F23Q 9/00; F23D 91/00; A62C 99/0081
See application file for complete search history.

(56) References Cited

U.S. PATENT DOCUMENTS

| | | | | |
|---|---|---|---|---|
| 4,475,882 A | * | 10/1984 | Gruner | F21L 19/00 362/179 |
| 4,983,124 A | * | 1/1991 | Ernst | A62C 99/0081 434/226 |
| 5,181,581 A | | 1/1993 | Layton et al. | |
| 5,233,869 A | | 8/1993 | Rogers et al. | |
| 5,275,571 A | | 1/1994 | Musto et al. | |
| 5,328,375 A | | 7/1994 | Rogers et al. | |
| 5,335,559 A | | 8/1994 | Rogers et al. | |
| 5,447,437 A | | 9/1995 | Joynt et al. | |
| 5,509,807 A | | 4/1996 | Joice et al. | |
| 5,688,136 A | | 11/1997 | Rogers et al. | |
| 6,647,932 B1 | * | 11/2003 | Cui | F24H 1/52 122/33 |
| 6,802,718 B2 | | 10/2004 | Musto et al. | |
| 7,008,230 B2 | | 3/2006 | Hoglund | |
| 7,175,439 B2 | | 2/2007 | Darois et al. | |

(Continued)

*Primary Examiner* — Timothy A Musselman
(74) *Attorney, Agent, or Firm* — Knobbe Martens Olson & Bear LLP

(57) ABSTRACT

A pilot and burner apparatus is provided for use in firefighting training. The apparatus includes a main fuel conduit and a main fuel valve. The apparatus includes a pilot tube and a pilot fuel conduit configured to deliver fuel from the main fuel conduit to the pilot tube. The apparatus includes main and pilot fuel valves to respectively control a flow of fuel in the main and pilot fuel conduits. In a pilot phase, the valves direct fuel to the pilot tube. An ignition component is configured to ignite fuel in the pilot tube to generate a pilot flame. In a burn phase, the pilot flame generates a controllable flame out of a main burner pipe by igniting fuel exiting the main fuel conduit. The controllable flame can be delivered to a training structure for training purposes.

20 Claims, 22 Drawing Sheets

(56) References Cited

U.S. PATENT DOCUMENTS

| | | |
|---|---|---|
| 7,744,373 B2 | 6/2010 | Williamson et al. |
| 7,748,983 B2 | 7/2010 | Blackburn et al. |
| 8,192,202 B2 | 6/2012 | Schütte et al. |
| 2007/0172801 A1 | 7/2007 | Darois et al. |
| 2009/0117503 A1* | 5/2009 | Cain ..................... F23G 7/068 |
| | | 431/12 |
| 2011/0250547 A1 | 10/2011 | Brown et al. |

* cited by examiner

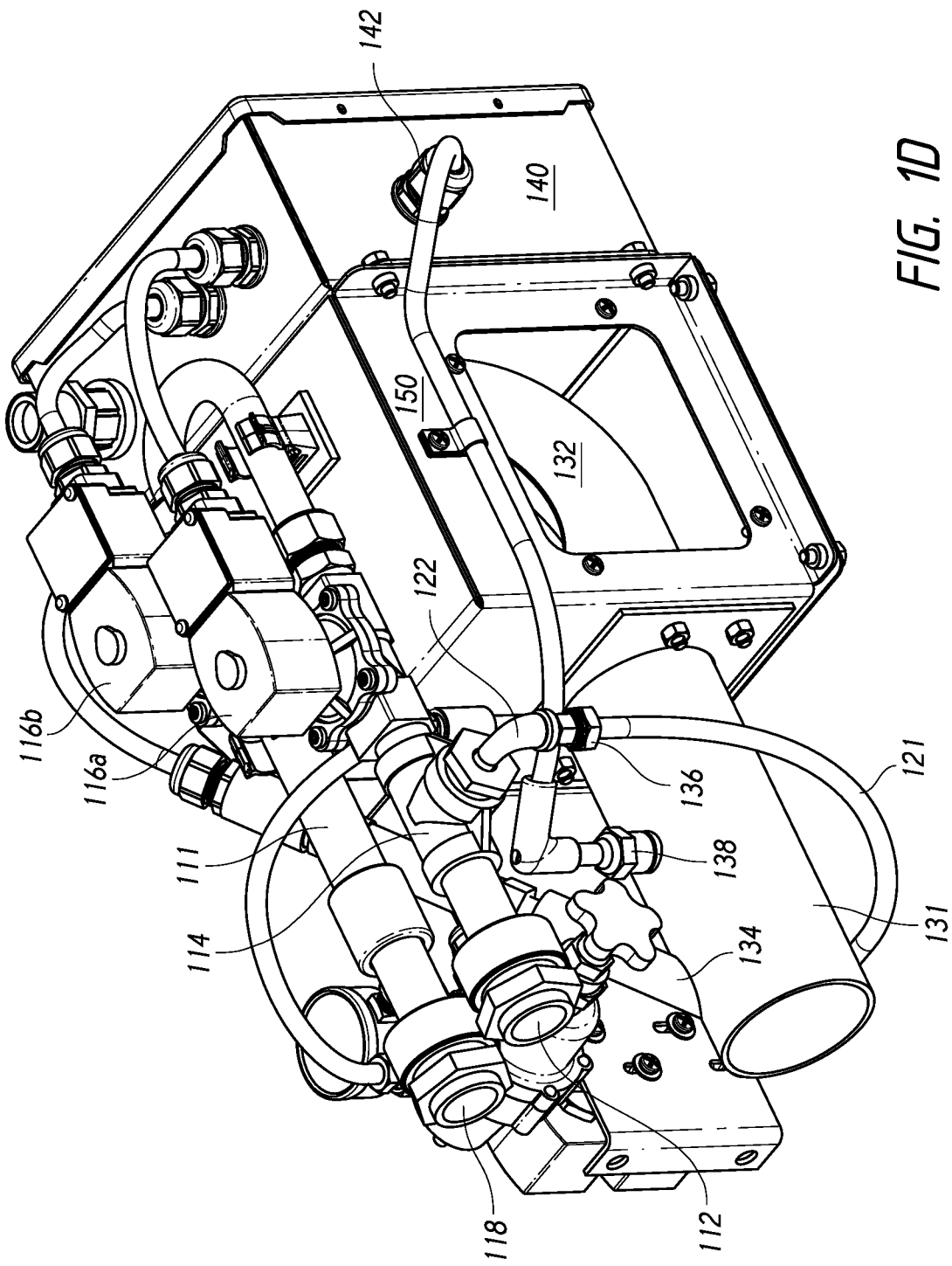

PILOT AND BURNER SYSTEM FOR FIREFIGHTING TRAINING

CROSS-REFERENCE TO RELATED APPLICATIONS

This application claims the benefit of priority to U.S. Prov. App'n No. 62/148,439, filed Apr. 16, 2015, entitled "Pilot and Burner System for Firefighting Training," the entire contents of which is incorporated herein by reference.

BACKGROUND

Field

The present disclosure relates to apparatuses and systems for providing controlled fires for training individuals in extinguishing fires, and in particular, apparatuses and systems that include an integrated pilot and burner system.

Description of Related Art

When training firefighters, law enforcement, port authorities, first responders, military and the like, an apparatus can be used to create simulated fire conditions to permit trainees to practice firefighting techniques. Different scenarios can be created for firefighting training through the use of such an apparatus in combination with a variety of training structures (e.g., fire props or burn props) and/or in a variety of environments (e.g., within a building, in the open, on or around a vehicle, etc.). The simulated fire conditions can be built and designed with a variety of scenarios trainees will likely face in the field. For example, simulated scenarios can include attic fires, hidden fires in dropped ceiling or cocklofts, electrical panel fires, pressurized pipe leak fires, high-rise building fires, vehicle fires, and the like. Being able to generate a variety of scenarios can aid in the efficacy and quality of the training. In addition, being able to provide frequent and repeatable training scenarios can increase the efficiency of the training process by providing multiple opportunities for trainees to face simulated fire conditions or being able to train a large number of people over a short period of time.

SUMMARY

Firefighting training can teach firefighters and other emergency responders to be more skilled and efficient in fighting fires. Training can also instruct people about the dangers of fighting fires, resulting in fewer injuries and death to the people that fight fires. Training facilities can be built and maintained that provide a variety of situations suitable for firefighting training. These facilities can be configured to provide a variety of situations and scenarios to educate and train firefighters, law enforcement, port authorities, first responders, military, and the like. These facilities can be in a fixed location or they can be mobile. The efficacy of such facilities is related to the quality of the training scenarios as well as the frequency with which scenarios can be utilized in training. These facilities can include pilot and burner systems that are designed to generate simulated fire conditions that are repeatable and controllable. For example, these pilot and burner devices can be used to create and to direct flames to desired locations with targeted or tailored conditions (e.g., intensity of flames) for use in training.

Downtime for maintenance, service, and/or repair of these pilot and burner apparatuses can interfere with operation of training facilities, potentially adversely affecting compliance with legal, regulatory, and/or administrative training requirements. In typical pilot and burner systems, the pilot and burner system would have to be completely removed along with its components from a flame device for maintenance, service, and/or repair. Such a procedure may require a field service technician to travel to the training location and to completely disassemble the piping and electrical infrastructure of the device on site. This may take several hours of labor plus travel costs, making it a relatively expensive procedure for the training facility. Additionally, if specific parts were needed to repair the pilot and burner systems, additional cost may be accrued for a return visit once parts were acquired. Furthermore, the capabilities of the training facility may be reduced during the period in which the pilot and burner system is being repaired. In addition, typical pilot and burner systems may be custom designed for the facilities where they are installed meaning that they are unique to the facility and not necessarily interchangeable with other pilot and burner systems. This can increase the cost of installation as well as costs for maintenance, repair, and/or replacement.

Typical pilot and burner systems include control and fuel lines for the pilot system that are separate from control and fuel lines for the burner system. Because the fuel source and/or control systems are typically located remotely from the pilot and burner system, this can mean that multiple fuel lines and/or electrical lines are installed between the fuel source and the control systems. In some installations, fire training structures or burn props are modified to accommodate these lines so that the lines are not exposed to the harsh conditions in the training scenarios. This can increase the complexity and cost of installation of such pilot and burner systems.

Accordingly, the present disclosure provides for a pilot and burner apparatus that is integrated into a single serviceable unit. The disclosed pilot and burner apparatus is configured to allow the apparatus to be removed by unplugging an electrical disconnection device, disconnecting mechanical connectors, and removing a connection with a fuel source. The apparatus, including valves, electrical components, ignition components, and pilot components, can be removed relatively efficiently (e.g., by removing relatively few connections or fasteners, without the use of tools, in less than 10 minutes, etc.) and either repaired locally on a table or sent back to the manufacture for repairs. In some instances, the apparatus can be replaced by an identical apparatus because the apparatuses are interchangeable rather than being custom-designed for the particular training facility. The pilot and burner apparatus can be a single, compact apparatus that incorporates a pilot system and a burner system with associated controls. The pilot and burner apparatus can be a compact apparatus, fitting within an envelope of about 18 inches by about 12 inches by about 10 inches, an envelope of less than or equal to about 18 inches cubed (18 in. by 18 in. by 18 in.), an envelope of less than or equal to about 20 inches cubed, an envelope of less than or equal to about 22 inches cubed, an envelope at least about 10 inches cubed and/or less than or equal to about 24 inches cubed, or an envelope at least about 12 inches cubed and/or less than or equal to about 18 inches cubed. The pilot and burner apparatus can be configured to be installed and removed by an individual. This can be due at least in part to the compact envelope of the apparatus as well as the weight of the apparatus (e.g., at least 25 pounds and/or less than or equal to about 50 pounds, at least about 30 pounds and/or less than or equal to about 45 pounds, or at least about 35 pounds and/or less than or equal to about 40 pounds).

The disclosed apparatus can reduce the cost of repairs for a training facility by reducing travel cost associated with repairs of the apparatus as well as costs for disassembling and reassembling the apparatus. The disclosed apparatus may also allow for the training facility to have an inventory of compatible apparatuses in stock that allow for an efficient exchange of components, allowing a unit to be sent off for maintenance while installing the interchangeable unit in the facility. This can reduce downtime of the training facility or training structure. The disclosed apparatus can also reduce the time and cost associated with manufacturing pilot and burner apparatuses for training facilities due at least in part to their interchangeability.

In addition, the present disclosure provides for an integrated pilot and burner apparatus that utilizes a single fuel line to provide fuel to both the pilot system and the burner system. The disclosed pilot and burner apparatus can be controlled using a local or remote burn control system that can operate the apparatus in a pilot phase to generate a pilot flame, and in a burn phase to provide a controlled flame to a training structure. This design can reduce the complexity and cost associated with operation, installation, maintenance, and repair of the pilot and burner apparatus. The integrated pilot and burner apparatus can be a single, compact apparatus that is easily installed and/or removed in intended structures or facilities.

The systems, methods and devices described herein have innovative aspects, no single one of which is indispensable or solely responsible for their desirable attributes. Without limiting the scope of the claims, some of the advantageous features will now be summarized.

In a first aspect, a pilot and burner apparatus is provided for use in firefighting training. The apparatus includes a main fuel conduit comprising a main fuel inlet and a main fuel outlet, said main fuel conduit having a pilot fuel opening in fluid communication with a pilot fuel conduit. The apparatus also includes a main fuel valve coupled to the main fuel conduit and configured to control a flow of fuel in the main fuel conduit between the main fuel inlet and the main fuel outlet. The apparatus also includes a pilot flame tube comprising a pilot outlet and an air inlet, said pilot flame tube having a pilot fuel opening in fluid communication with said pilot fuel conduit. The apparatus also includes a pilot flame fan coupled to the pilot flame tube at the air inlet of the pilot flame tube so that, in use, the pilot flame fan delivers a flow of air into the pilot flame tube through the air inlet. The pilot fuel conduit includes a pilot fuel inlet fluidly coupled to the pilot fuel opening of the main fuel conduit so that, in use, at least a portion of the flow of fuel in the main fuel conduit is directed into the pilot fuel conduit; and a pilot fuel outlet fluidly coupled to the pilot fuel opening of the pilot flame tube so that, in use, at least a portion of a flow of fuel in the pilot fuel conduit is directed into the pilot flame tube. The apparatus also includes a pilot fuel valve coupled to the pilot fuel conduit and positioned between the pilot fuel inlet and the pilot fuel outlet, the pilot fuel valve configured to control the flow of fuel in the pilot fuel conduit between the pilot fuel inlet and the pilot fuel outlet. The apparatus also includes an ignition component mechanically coupled to the pilot flame tube so that, in use, the ignition component ignites fuel in the pilot tube. The apparatus also includes a flame detection component mechanically coupled to the pilot flame tube so that, in use, the flame detection system generates electronic measurements corresponding to flame conditions within the pilot flame tube.

In some embodiments of the first aspect, the apparatus further includes a pilot regulator coupled to the pilot fuel conduit, the pilot regulator configured to regulate a fuel pressure in the pilot fuel conduit. In some embodiments of the first aspect, all of the components of the pilot and burner apparatus are configured to fit within an envelope of about 18 inches by about 12 inches by about 10 inches. In some embodiments of the first aspect, the apparatus further includes a secondary main fuel valve positioned between the main fuel valve and the main fuel outlet. In some embodiments of the first aspect, the apparatus further includes a secondary pilot fuel valve positioned between the pilot fuel valve and the pilot fuel outlet.

In some embodiments of the first aspect, the ignition component includes an ignition coil and a flame igniter, wherein the ignition coil is electrically coupled to the flame igniter, and wherein the flame igniter is mechanically coupled to the pilot flame tube so that, in use, the flame igniter receives electric current from the ignition coil and generates a spark to ignite fuel in the pilot flame tube.

In some embodiments of the first aspect, the flame detection component comprises an optical sensor configured to generate electrical signals corresponding to levels of electromagnetic radiation within the pilot flame tube. In a further embodiment of the first aspect, the optical sensor comprises an ultraviolet sensor configured to generate electrical signals corresponding to levels of ultraviolet radiation within the pilot flame tube.

In some embodiments of the first aspect, the apparatus further includes a support structure configured to couple to one or more of the pilot flame tube, the main fuel conduit, and the pilot fuel conduit. In a further embodiment of the first aspect, the support structure comprises mounting interface elements configured to securely mount the pilot and burner apparatus to a training structure without the use of tools. In another further embodiment of the first aspect, the apparatus includes an electrical enclosure coupled to the support structure. In a further embodiment, the ignition component comprises an ignition coil electrically coupled to a flame igniter, the ignition component positioned within the electrical enclosure.

In a second aspect, a firefighting training system is provided that includes a pilot and burner apparatus having a support structure, a main fuel conduit supported by the support structure, the main fuel conduit comprising a main fuel inlet and a main fuel outlet. The apparatus also includes a main fuel valve coupled to the main fuel conduit, the main fuel valve configured to control a flow of fuel in the main fuel conduit, a pilot flame tube supported by the support structure, the pilot flame tube comprising an air inlet and a pilot flame tube outlet. The apparatus also includes a pilot fuel conduit comprising a pilot fuel inlet fluidly coupled to an opening of the main fuel conduit and a pilot fuel outlet fluidly coupled to the pilot flame tube. The apparatus also includes a pilot fuel valve coupled to the pilot fuel conduit, the pilot fuel valve configured to control a flow of fuel in the pilot fuel conduit. The apparatus also includes an ignition component coupled to the pilot flame tube. The apparatus also includes a flame detection component coupled to the pilot flame tube. The system also includes a fuel source fluidly coupled to the main fuel conduit of the pilot and burner apparatus to provide a flow of fuel in the main fuel conduit and a flame control system electrically coupled to the pilot and burner apparatus. In a pilot phase, the flame control system is configured to control the pilot and burner apparatus to close the main fuel valve to inhibit the flow of fuel out of the main fuel outlet; open the pilot fuel valve so that at least a portion of the flow of fuel in the main fuel conduit passes through the pilot fuel conduit and enters the pilot tube through the pilot outlet interface; generate a spark within the pilot tube with the ignition component to ignite fuel in the pilot tube to generate a pilot flame; receive measurements from the flame detection component; and determine that the pilot flame has ignited based on the received measurements. In a burn phase, the flame control system is configured to control the pilot and burner apparatus to open the main fuel valve so that at least a portion of the flow of fuel from the fuel source exits the main fuel conduit through the main fuel outlet.

In some embodiments of the second aspect, the fuel source is configured to deliver at least one of propane, butane, or natural gas to the pilot and burner apparatus. In some embodiments of the second aspect, the system further includes a main burner pipe coupled to the pilot flame tube, the main burner pipe configured to direct a pilot flame from the pilot and burner apparatus to a targeted location within the firefighting training system. In a further embodiment, in the burn phase, fuel exiting the main fuel outlet is directed to the targeted location using a fuel pipe coupled to the main fuel outlet; the pilot flame in the pilot tube is directed to an end of the main burner pipe at the targeted location using an air distribution system coupled to the pilot flame tube; and a flame ignites when the fuel from the fuel pipe is ignited by the pilot flame leaving the main burner pipe.

In some embodiments of the second aspect, the system also includes a fuel source pressure regulator configured to regulate a fuel pressure from the fuel source. In a further embodiment, the pilot and burner apparatus further comprises a pilot regulator coupled to the pilot fuel conduit, the pilot regulator configured to regulate a fuel pressure in the pilot fuel conduit.

In some embodiments of the second aspect, the flame control system is integrated into the pilot and burner apparatus. In a further embodiment, the pilot and burner apparatus further comprises an electrical enclosure coupled to the support structure and the flame control system is positioned within the electrical enclosure.

In some embodiments of the second aspect, the pilot and burner apparatus further comprises a wireless communication module. In a further embodiment, the flame control system is configured to wirelessly communicate with the pilot and burner apparatus through the wireless communication module.

In a third aspect, a pilot and burner apparatus is provided that includes a support structure. The apparatus also includes a main fuel conduit coupled to the support structure, the main fuel conduit comprising a main fuel inlet, a main fuel outlet, and a pilot conduit connection. The apparatus also includes a main fuel valve coupled to the main fuel conduit, the main fuel valve configured to control a flow of fuel in the main fuel conduit. The apparatus also includes a pilot flame tube coupled to the support structure, the pilot tube comprising an air inlet, a pilot outlet connection and a pilot flame tube outlet. The apparatus also includes a pilot fuel conduit comprising a pilot fuel inlet fluidly coupled to the pilot conduit connection of the main fuel conduit and a pilot fuel outlet fluidly coupled to the pilot outlet connection of the pilot flame tube. The apparatus also includes a pilot fuel valve coupled to the pilot fuel conduit, the pilot fuel valve configured to control a flow of fuel in the pilot fuel conduit. The apparatus also includes an ignition component coupled to the pilot flame tube. The apparatus also includes a flame detection component coupled to the pilot flame tube.

In a fourth aspect, a firefighting training apparatus is provided that includes the pilot and burner apparatus of the third aspect. The apparatus also includes a training structure and a fuel pipe fluidly coupled to the main fuel outlet of the pilot and burner apparatus. The apparatus also includes a main burner pipe comprising a pilot flame inlet and a pilot flame outlet, the main burner pipe coupled to the training structure. The main burner pipe is configured to direct a pilot flame from the pilot flame tube to a targeted location within the firefighting training apparatus. The fuel pipe is configured to convey fuel to the targeted location within the firefighting training apparatus. The pilot and burner apparatus is configured to control a flow of fuel within the fuel pipe. The main burner pipe and the fuel pipe are configured to generate a flame at the targeted location in the training structure to simulate the training structure being on fire.

In some embodiments of the fourth aspect, the training structure is shaped like a car. In some embodiments of the fourth aspect, the training structure comprises a wall, a ceiling, and a flame outlet to direct the flame delivered from the main burner pipe along a ceiling of the training structure. In some embodiments of the fourth aspect, the pilot and burner apparatus is positioned within the training structure. In some embodiments of the fourth aspect, the pilot and burner apparatus is positioned outside of the training structure. In a further embodiment, the pilot and burner apparatus is positioned at least 10 feet from the training structure.

In a fifth aspect, a firefighting training apparatus having a plurality of burn zones is provided. The apparatus includes a training structure comprising the plurality of burn zones. The apparatus also includes a corresponding pilot and burner apparatus for each of the plurality of burn zones, each of the corresponding pilot and burner apparatuses according to the pilot and burner apparatus of the third aspect. The apparatus also includes a corresponding fuel pipe fluidly coupled to a main fuel outlet of a respective pilot and burner apparatus. The apparatus also includes a corresponding main burner pipe comprising a pilot flame inlet and a pilot flame outlet, the pilot flame inlet coupled with a pilot flame tube of a respective pilot and burner apparatus. For individual burn zones the main burner pipe is configured to direct a pilot flame from the pilot flame tube to the respective burn zone, the fuel pipe is configured to convey fuel to the respective burn zone, the respective pilot and burner apparatus is configured to control a flow of fuel within the fuel pipe, and the main burner pipe and the fuel pipe are configured to generate a flame at the respective burn zone in the training structure to simulate the burn zone being on fire.

In a sixth aspect, a fire training prop comprising non-flammable materials is provided. The prop includes at least two simulated fire locations. For individual simulated fire locations, the prop includes a dedicated compact pilot and burner apparatus positioned remotely from the simulated fire location. Individual compact pilot and burner apparatuses are configured to include valves to control a flow of fuel to the simulated fire location as well as to provide a pilot flame to the simulated fire location. Individual compact pilot and burner apparatuses have physical dimensions that fit within an envelope of about 18 inches by 12 inches by 10 inches.

In some embodiments of the sixth aspect, individual compact pilot and burner apparatuses are interchangeable with one another. In some embodiments of the sixth aspect, individual compact pilot and burner apparatuses are removable from the fire training prop. In a further embodiment, removing a pilot and burner apparatus comprises disengaging a mechanical fastener, disconnecting an electrical cable, disconnecting a fuel source, and disconnecting a fuel outlet conduit.

In a seventh aspect, a compact pilot and burner apparatus is provided that includes a main fuel system configured to control a flow of fuel within the pilot and burner apparatus. The apparatus also includes a pilot fuel system fluidly coupled to the main fuel system and configured to control a flow of fuel within the pilot fuel system. The apparatus also includes a pilot flame system fluidly coupled to the pilot fuel system, the pilot flame system configured to generate a pilot flame using the flow of fuel within the pilot fuel system. The apparatus also includes an electrical control system configured to transmit electrical signals to the main fuel system, the pilot fuel system, and the pilot flame system. The apparatus also includes a support structure configured to directly or indirectly provide mechanical support for the main fuel system, the pilot fuel system, the pilot flame system, and the electrical control system. The compact pilot and burner apparatus fits within a physical envelope of about 18 inches by 12 inches by 10 inches.

In some embodiments of the seventh aspect, the apparatus weighs at least about 25 pounds and less than or equal to about 50 pounds. In some embodiments of the seventh aspect, the apparatus is configured to be removed from a training structure by disconnecting a single electronic controller plug, disengaging two mechanical fasteners, and disconnecting two gas conduits. In some embodiments of the seventh aspect, the apparatus can be installed and/or removed in a training structure by one individual.

BRIEF DESCRIPTION OF THE DRAWINGS

Throughout the drawings, reference numbers may be reused to indicate general correspondence between reference elements. The drawings are provided to illustrate example embodiments described herein and are not intended to limit the scope of the disclosure.

FIGS. 1A-1D illustrate various views of an example pilot and burner apparatus.

DETAILED DESCRIPTION

Figure 1A:
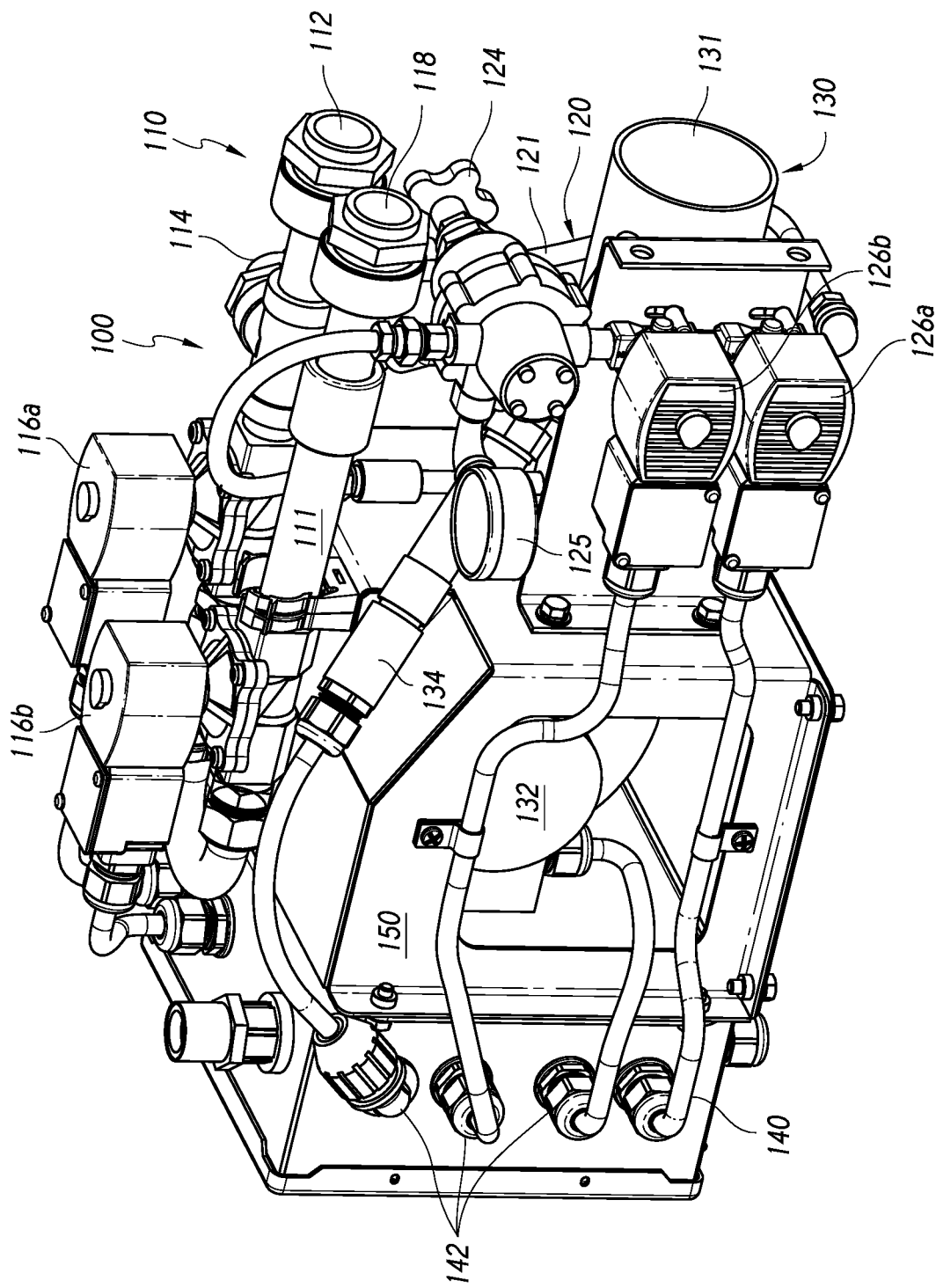
Figure 1B:
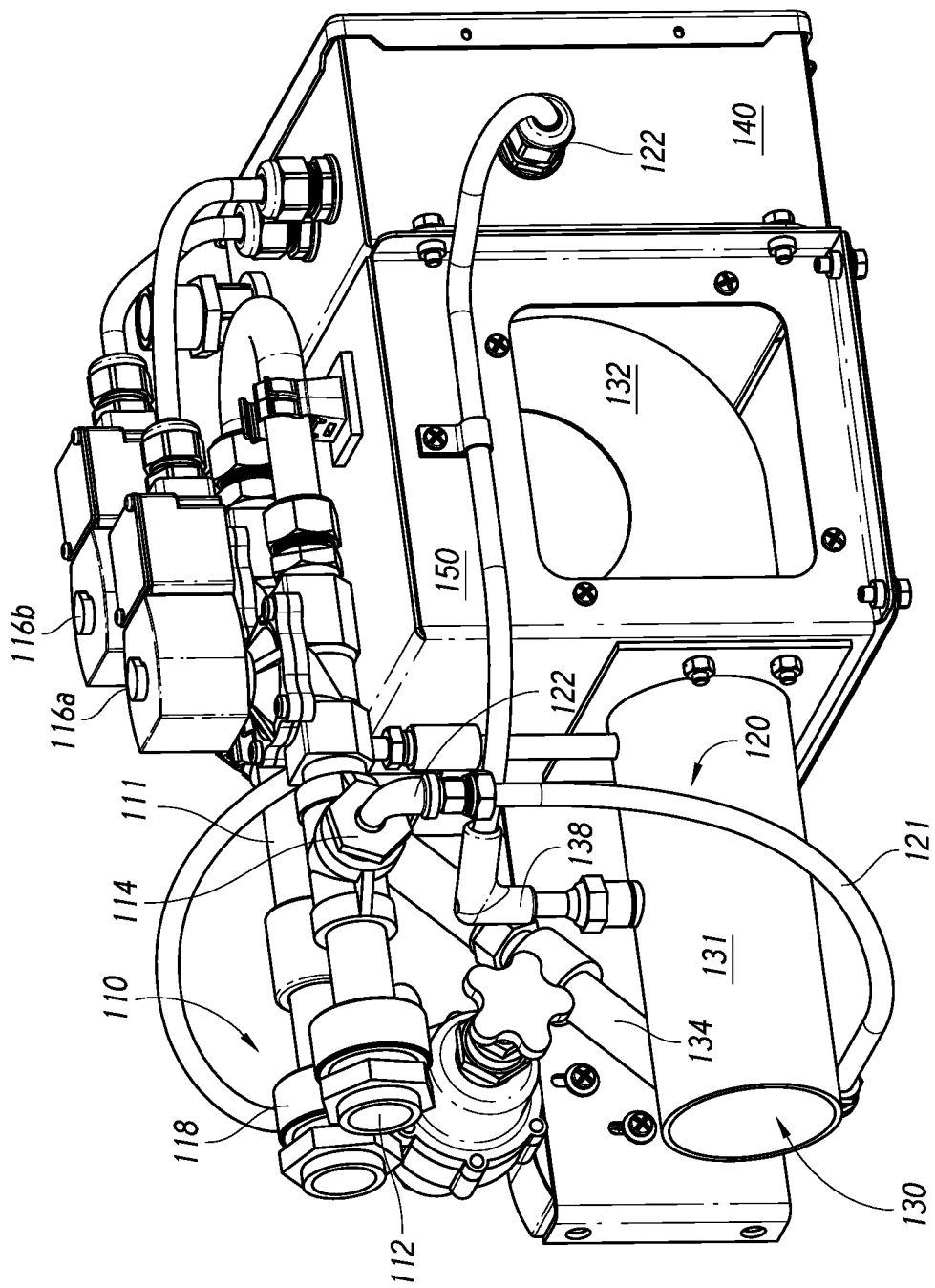
Figure 1C:
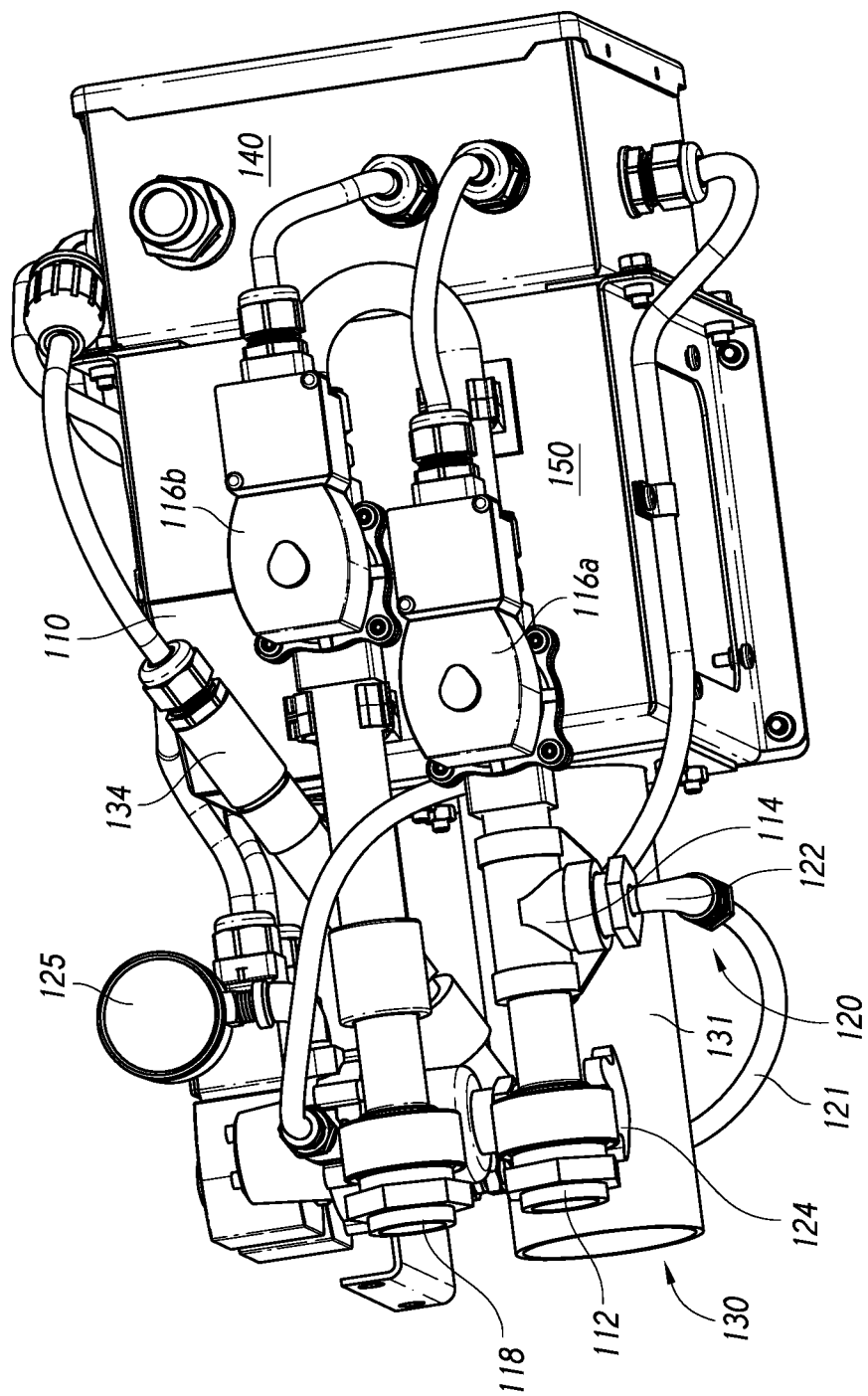

Certain embodiments and examples of pilot and burner apparatuses for generating repeatable and/or controllable flames for use in firefighting training are described herein. Those of skill in the art will appreciate that the disclosure extends beyond the specifically disclosed embodiments and/or uses and obvious modifications and equivalents thereof. Thus, it is intended that the scope of the disclosure not be limited by any particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components.

For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein. It is contemplated that the particular features, structures, or characteristics of any embodiments discussed herein can be combined in any suitable manner in one or more separate embodiments not expressly illustrated or described. In many cases, structures that are described or illustrated as unitary or contiguous can be separated while still performing the function(s) of the unitary structure. In many instances, structures that are described or illustrated as separate can be joined or combined while still performing the function(s) of the separated structures.

The pilot and burner apparatuses and systems described herein can be utilized to create customized firefighting training scenarios. Such training scenarios can include, in some embodiments, at least two simulated flame locations in a structure or prop wherein control of the flames for each location can be supplied through an individual pilot and burner apparatus. The individual pilot and burner apparatuses can be located remotely from the simulated flame locations, delivering the pilot flame and fuel for the burners through dedicated conduits. For example, a plurality of pilot and burner apparatuses can be used to generate separately controlled fire zones, interior fire training simulations, fires with expansion capabilities to multiple fire points, and/or changeable facility configurations. The apparatuses can be used to control fire characteristics, allowing a training facility to customize, tailor, design, and/or control the training experience. The apparatuses can be used in conjunction with fire training props including, for example and without limitation, kitchens/stove tops, beds, sofas, desks, hallways, rooms, rollovers (e.g., when fire gases in an enclosed area ignite), flashovers (e.g., ignition), vehicles, gas/fuel tanks, dumpsters, barbecues, gas lines/meters, dip tanks, and the like. In some embodiments, a plurality of apparatuses can be configured to deliver independently controlled burn zones, each of which has its own independent pilot and burner apparatus. For example, to simulate a vehicle fire, the apparatuses can be configured to provide a single fire evolution scenario where a fire progresses from an engine area, to a passenger area, to a wheel-brake area, and/or a fuel spill area. The apparatuses can be controlled from a burn control system to provide a scenario where the fire spreads in the vehicle or a scenario where trainees deal with a fully involved fire.

In some embodiments, a fire training prop can be made at least partially of non-flammable materials and can include at least two simulated flame locations. Control of the flames for each location can be provided through a single, compact combined controller and flame generator located remote from the flame location. The compact controller and flame generator can include electronically controllable valves for the fuel to supply fuel for the simulated flame locations combined with an electronically controllable pilot tube with a pilot ignition system.

The pilot and burner apparatus can be configured as a single, integrated, compact unit, wherein all components of the apparatus are within close proximity to one another. For example, some embodiments of the pilot and burner apparatus can fit within an envelope having dimensions of between about 14 inches by 9 inches by 8 inches and about 22 inches by 15 inches by 13 inches. The single, integrated, compact unit can be configured to be installed and removed relatively easily. For example, the unit can be removed from a burn prop by disconnecting an electrical plug, unscrewing two bolts, and disconnecting two gas conduits, allowing the unit to be physically removed from the prop by a single person. As another example, the apparatus can be configured to be installed and removed without the use of tools (e.g., fasteners can be fastened by hand to sufficiently secure the apparatus in place). The apparatus can have a size and weight configured so that a single person can install and/or remove the unit. The pilot and burner apparatus can be limited to an electrical box configured to route electrical signals to electrical components with associated electrical cables and connectors; a main fuel system that includes one or more main fuel valves; a pilot fuel system that includes one or more pilot fuel valves and possibly a gauge; a pilot flame system that includes a pilot tube, a blower, an ignition system, and a flame detection system; and a support structure to mechanically support the components of the pilot and burner apparatus.

The pilot and burner apparatus can utilize gas as a source for producing fire. For example, propane, butane, and/or natural gas can be used to produce fires that generate heat and smoke for a training experience that models real life conditions. Gas-based fires can also be used to simulate a variety of fire behaviors. The pilot and burner apparatus can be used to provide a variety of training evolutions that may be repeated to allow all trainees to get hands-on firefighting experience with relatively little downtime. The pilot and burner apparatus can be configured to allow an operator, such as an instructor, to start and stop flames during training, to begin a new training session, or evolution, as desired, and/or to modify properties of the fire during training to adapt the training. The pilot and burner apparatus can include an integrated pilot system that operates using the fuel from the main fuel source to provide reliable ignition of a flame. The pilot and burner apparatus can also include a blower or forced air system to aid in the reliability of flame ignition and/or to provide a flame at a distance from the pilot and burner apparatus. The pilot and burner apparatus can include a main fuel conduit that selectively controls the flow of fuel through the apparatus wherein fuel can be directed to the pilot system for igniting and sustaining a pilot flame and/or fuel can be directed through the main fuel conduit to a fuel conduit for a prop, the pilot and burner apparatus configured thereby to control fuel delivered to the prop.

Example Pilot and Burner Apparatus

FIGS. 1A-1D illustrate various views of an example pilot and burner apparatus 100. The pilot and burner apparatus 100 includes a main fuel system 110, a pilot fuel system 120, a pilot flame system 130, electrical components 140, and structural components 150. The pilot and burner apparatus 100 is configured to receive fuel from a fuel source and to selectively control the flow of the fuel to provide fuel within the main fuel system 110, the pilot fuel system 120, and/or the pilot flame system 130. In some embodiments, the fuel source can provide fuel at a single input point at the apparatus 100 (e.g., at the main fuel system 110), wherein the fuel is used to both light a pilot flame and to provide fuel for a flame at a burn prop, the fuel therefore controlled by the apparatus 100 to ignite and to maintain a pilot flame and to generate and control a flame at a training structure (e.g., a burn prop, a room, etc.).

The pilot and burner apparatus 100 includes a main fuel system 110. The main fuel system 110 includes a main fuel conduit 111 comprising one or more fluidly coupled segments, a main fuel inlet 112, a pilot conduit interface 114, one or more main fuel valves 116a, 116b, and a main fuel outlet 118. The main fuel system 110 forms a sealed conduit for fuel, controlling the flow of fuel in the main fuel conduit 111 from the main fuel inlet 112 to the main fuel outlet 118 and/or the pilot conduit interface 114. The main fuel conduit 111 can comprise hoses, pipes, connectors, or the like. The main fuel conduit 111 can be fluidly connected to the main fuel inlet 112, the pilot conduit interface 114, and the main fuel outlet 118. The main fuel conduit 111 can be configured to fluidly connect the fuel source to the pilot fuel system 120 and a fuel conduit configured to deliver fuel to a burn prop (not shown).

In use, fuel (e.g., a gas such as propane, butane, natural gas, etc.) enters the main fuel system 110 through the main fuel inlet 112. The main fuel valves 116a, 116b coupled to the main fuel conduit 111 control the flow of gas through the main fuel conduit 111 and/or to a pilot fuel conduit 121 through the pilot conduit connection 114. The main fuel valves 116a, 116b can be, for example and without limitation, a solenoid-operated shutoff valve, a motor valve, a pneumatic valve, a hydraulic valve, etc. The main fuel valves 116a, 116b can comprise a primary main valve 116a and a secondary main valve 116b. In some embodiments, the pilot and burner system 100 does not include the secondary main valve 116b. The main fuel system 110 includes a main fuel outlet 118 configured to deliver fuel to a fuel pipe of a training structure (not shown). In use, the fuel from the main fuel system 110 can be delivered to the fuel pipe of the training structure to control a flame at the training structure. The flame can be generated by combining the fuel from the main fuel system 110 with a pilot flame generated by the pilot combustion system 130, the pilot combustion system 130 receiving fuel from the pilot fuel system 120. In certain implementations, the flame at the training structure can be remote from the pilot and burner apparatus 100, the fuel delivered from the apparatus 100 to the flame location through the fuel pipe of the training structure and the pilot flame being delivered from the apparatus 100 to the flame location through a main burner pipe.

The main fuel inlet 112 interconnects a fuel source (not shown) to the main fuel system 110. The fuel source includes but is not limited to tanks, cylinders, drums and combinations thereof containing an ignitable gas or liquid fuel such as ethane, propane, butane, pentane, hexane, gasoline, diesel, and combinations thereof. The fuel source can include one or more pressure regulators. The pressure regulators at the fuel source can be used to control the fuel pressure within the main fuel system 110. The fuel source can be attached to the main fuel inlet 112 via quick connectors, hose, rubber tubing, metal piping, and the like. The main fuel conduit 111 can include connection pipes, pipe adapters, nipples, joints, and the like which fit together to allow fuel to flow from a fuel source through the main fuel system 110, to the pilot fuel system 120, and/or to fuel pipe of a training structure (not shown).

The pilot and burner apparatus 100 includes pilot fuel system 120 configured to deliver fuel from the main fuel system 110 to the pilot flame system 130. The pilot fuel system 120 includes a pilot fuel conduit 121 comprising one or more fluidly coupled segments, a pilot fuel inlet 122, a pilot fuel regulator 124 with a gauge 125, and one or more pilot fuel valves 126a, 126b. The pilot fuel system 120 forms a sealed conduit for fuel, controlling the flow of fuel in the pilot fuel conduit 121 from the pilot conduit connection 114 to a pilot tube connection 136 on a pilot tube 131. The pilot fuel conduit 121 can comprise hoses, pipes, or the like. The pilot fuel conduit 121 can be fluidly connected to the pilot conduit connection 114 and the pilot tube connection 136. The pilot fuel conduit 121 can be configured to deliver fuel to the pilot flame system 130 for igniting and maintaining a pilot flame.

The pilot fuel regulator 124 can be fluidly connected to the pilot fuel conduit 121. The pilot fuel regulator 124 can be configured to regulate the pressure of fuel within the pilot fuel system 120, the fuel being provided from the main fuel system 110 at the pilot conduit connection 114. The pilot fuel regulator 124 may be of any suitable type and may include an adjustment bladder or diaphragm. The pilot fuel regulator 124 may include a gauge 125 to provide information regarding the fuel pressure provided by the pilot fuel regulator 124 for testing and verification purposes during maintenance and/or use of the pilot and burner apparatus 100. The pilot fuel regulator 124 can be used to regulate the pressure of fuel within the pilot fuel system 120, and the pressure of the fuel within the main fuel system 110 can be regulated by one or more regulators at the fuel source.

The pilot and burner apparatus 100 includes a pilot flame system 130 configured to generate a pilot flame that can be used to ignite a flow of fuel. The pilot flame system 130 includes an ignition system comprising an ignition device 138. The ignition device 138 is coupled to a pilot flame tube 131 to ignite fuel within the pilot flame tube 131 to produce a flame, e.g., a controlled live fire that emanates from the pilot flame tube 131. The ignition device 138 can be a manual ignition device or an automatic ignition device. The ignition device 138 can be a flame igniter, such as a spark plug or other electrical device that generates a spark when energized with electrical current such as a spark igniter. The ignition device 138 can be electrically coupled to an ignition coil (not shown). The ignition coil, in some embodiments, can be positioned within the electrical enclosure 140.

The pilot flame system 130 includes an air distribution system 132. The air distribution system 132 can include a pilot combustion fan. The pilot combustion fan can include a variable speed drive and a blower that can be used to vary the airflow through the air distribution system 132. The pilot combustion fan can receive air from ambient air. In certain implementations, the air distribution system 132 can be configured to generate sufficient air flow to provide flames out of the end of a 15-foot main burner pipe that has a 3-inch diameter.

The pilot flame system 130 includes a pilot system positioned within the pilot flame tube 131 that is operable to generate a pilot flame by exposing fuel received at the pilot tube connection 136 of the pilot flame tube 131 to the ignition device 138.

The pilot flame system 130 includes a flame detection system 134. The flame detection system 134 can be coupled to the pilot flame tube 131 so that the flame detection system 134 is positioned to detect properties within the pilot flame tube 131. In some embodiments, the flame detection system 134 is positioned within the enclosure of the pilot flame tube 131. For example, the flame detection system 134 can include a sensor housing that protrudes into the pilot flame tube 131 so that the pilot flame will be in a detection range of a sensor (e.g., a field of view of an optical sensor) positioned in the sensor housing. In certain embodiments, the flame detection system 134 is positioned so that a field of view or area of detection of the flame detection system 134 includes a portion of the interior of the pilot flame tube 131, but the flame detection system 134 is positioned so that it is not within the pilot flame tube 131. For example, where the flame detection system 134 includes an optical sensor, the optical sensor can be positioned so that it is not within the pilot flame tube 131 but a field of view of the optical sensor includes the interior of the pilot flame tube 131 through an opening in the side of the pilot flame tube 131. The flame detection system 134 can include an optical sensor configured to generate electrical signals corresponding to levels of electromagnetic radiation within a field of view of the optical sensor. In some embodiments, the optical sensor is configured to be sensitive to electromagnetic radiation in the ultraviolet portion of the electromagnetic spectrum. When a flame is present, the flame detection system 134 can produce signals indicative of the presence of a flame. In the absence of a flame, the flame detection system 134 can produce signals indicative of the absence of a flame.

In use, fuel can be introduced into the pilot flame tube 131 via the pilot tube connection 136 where it is ignited, using the ignition device 138 that can provide a spark within the pilot flame tube 131 igniting the fuel. Once ignited, the pilot flame can be monitored by the flame detection system 134. In some embodiments, the pilot and burner apparatus 100 can include a pilot system positioned within the pilot flame tube 131.

The pilot and burner apparatus 100 includes electrical components 140 configured to electrically couple various components to a centralized location for distribution to a flame control system, such as the flame control system described with reference to FIGS. 2A-2B. The electrical components 140 include a physical enclosure for protecting the electrical connections. The electrical components 140 include connections 142 to provide a means for electrical cables to pass from within the enclosure to electrical components of the pilot and burner apparatus 100. In some embodiments, the connections 142 are plugs into which female or male ends of electrical connectors couple. In certain embodiments, the connections 142 are physical pass-through elements that provide a path for electrical cables to pass from without the enclosure to within the enclosure. The electrical components 140 can electrically couple to the main fuel valves 116a, 116b, the pilot fuel valves 126a, 126b, the pilot fuel regulator 124, the flame detection system 134, the igniter device 138, the pilot flame fan 132, and/or other electrical components.

The pilot and burner apparatus 100 includes structural components 150 configured to support various components of the pilot and burner apparatus 100. In some embodiments, the structural components 150 are configured to securely mount, latch, and/or fasten to a training structure and/or a mounting plate within the training structure. The structural components 150 can include flanges, hooks, or other physical features that mate with corresponding elements on the mounting plate or training structure to be able to securely attach the pilot and burner apparatus 100 without the need for tools. In certain implementations, the pilot and burner apparatus 100 can be removed and/or installed without the use of tools in less than or equal to about 10 minutes, in less than or equal to about 5 minutes, or in less than or equal to about 2 minutes. In some embodiments, additional components can be used to secure the structural components 150 to the mounting plate including screws, T-handles, washers, nuts, bolts, latches, springs, locks, clips, and the like. In some embodiments, tools can be used to secure the pilot and burner apparatus 100 to the mounting plate or the training structure. The electrical enclosure 140 can be coupled to the structural components 150.

In certain implementations, the structural components 150 can be configured to latch or otherwise securely fasten to a mounting structure (e.g., within a training structure) without the use of tools to allow installation and/or removal of the pilot and burner apparatus 100 in a relatively little amount of time (e.g., in less than about 10 minutes, in less than about 5 minutes, or in less than about 2 minutes). For example, the structural components 150 can include openings shaped to mate with corresponding features on a mounting bracket (not shown) in a training structure (e.g., a fire prop) so that the mounting structure can be placed on the corresponding features and slid into place. In some implementations, after sliding the pilot and burner apparatus 100 into place, one or more securing mechanisms can be employed to secure the structural components 150 in place, examples of which are described in greater detail with reference to FIGS. 10A and 10B. For example, the one or more securing mechanisms can include, without limitation, T-handles, clamps, clips, latch clamps, wingnuts, hand-tightened screws, hand-tightened nuts and bolts, a combination of these, or the like. The configuration of the structural components and the securing mechanisms can make it relatively efficient and easy to install and/or remove the pilot and burner apparatus 100 relative to an apparatus that is mounted using more permanent means (e.g., welding, gluing, etc.) or an apparatus that is mounted using methods that require the use of tools (e.g., screws and screwdrivers, bolts and wrenches, etc.). In some embodiments, the mechanical structure 150 includes two or more T-handles used to secure the pilot and burner apparatus 100 to a fire training structure. The mechanical structure 150 can include tool-less bolts (e.g., bolts that can be installed and removed without the use of tools) to attach and secure the pilot and burner apparatus 100 within a structure or at a desired location.

The mechanical structure 150 can be configured to position and secure the components of the pilot and burner apparatus 100 within close proximity of one another. For example, the components of the pilot and burner apparatus can fit within an envelope that forms a cube with sides between about 10 inches and about 23 inches (e.g., the envelop can be about 18 inches long by about 12 inches wide by about 10 inches high).

The pilot and burner apparatus 100 provides a number of advantages over other similar systems. For example, the pilot and burner apparatus 100 can operate using a single fuel line in, the fuel being distributed to the main fuel system 110 and the pilot fuel system 120. The pilot and burner apparatus 100 integrates a pilot system with a burner system so that the pilot flame is generated using the same apparatus that controls the flame for a training structure. This can be advantageous to allow quick evolutions and/or repetitions of fire training drills. The pilot and burner apparatus 100 can be configured to be installed and/or removed relatively easily. The pilot and burner apparatus 100 can have standardized input and output for the fuel line and the flame, allowing for a manufacturer to produce multiple apparatuses for multiple applications rather than producing custom-designed pilot modules and/or burner systems for custom installations. This can also allow a customer such as a training facility to have spare units in case an apparatus is in need of service or repair. The pilot and burner apparatus 100 can be compact. This can advantageously allow installation in a variety of burn props or training structures. This can also advantageously allow for relatively easy installation and/or removal.

Example Pilot and Burner System

Figure 2:
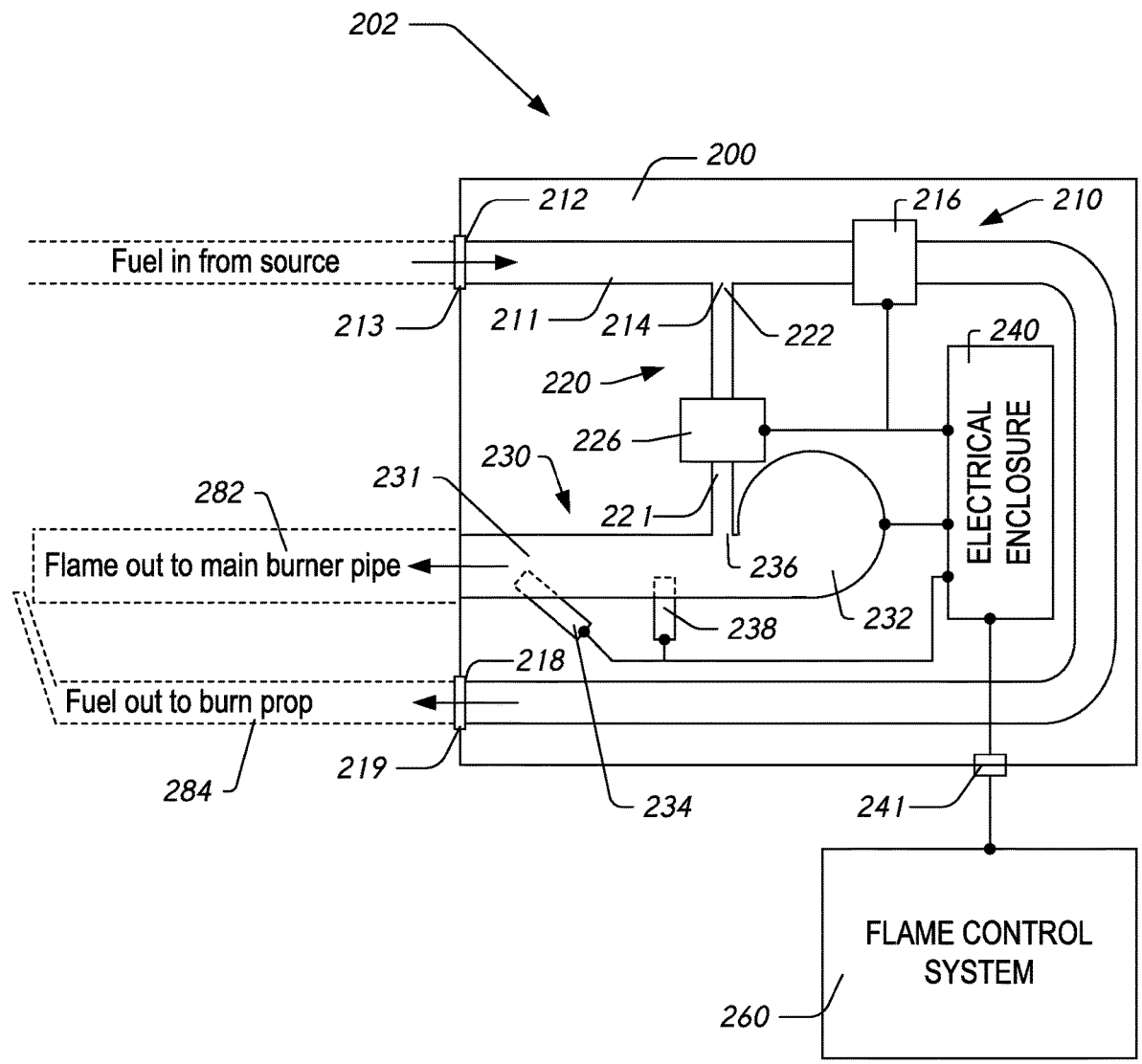
FIG. 2 illustrates a functional block diagram of an example pilot and burner system.

FIG. 2 illustrates a functional block diagram of an example pilot and burner system 202 including a pilot and burner apparatus 200 and a flame control system 260. The pilot and burner apparatus 200 can be similar to any of the pilot and burner apparatuses described herein with reference to FIGS. 1, 4, and 5. The pilot and burner apparatus 200 can be configured to be communicably coupled to the flame control system 260. The flame control system 260 can be configured to control components of the pilot and burner apparatus 200 to light a pilot flame, to control the flow of fuel to a burn prop through fuel pipe 284, to control the pilot flame delivered through a main burner pipe 282, and/or to control attributes of the fire produced by the pilot and burner apparatus 200. Attributes of the fire produced can include, but are not limited to, flame shape, flame height, flame volume, burn rate, visual effects, and combinations thereof. In some implementations, the attributes of the fire produced by the pilot and burner apparatus 200 can be controlled independent of the flame control system 260 or in conjunction with the flame control system 260 using mechanical, electrical, and electromechanical devices such as fans, flaps, louvers, dampers, and the like incorporated into training structures.

In some embodiments, the flame control system 260 provides a human machine interface configured to provide training personnel or other operators the ability to control the generation, cessation, and/or characteristics of the training fires. The human machine interface can include displays that have multifunction windows and a menu-driven interface with the ability to control one or more pilot and burner apparatuses 200. The pilot and burner apparatuses 200 can be included in systems configured to provide smoke distribution, compliance safety training, flame spread capabilities, fire extension capabilities, flashover capabilities, wireless control, data logging, run counters and timers, and the like. The pilot and burner system 202 can be configured for remote access and/or management. This can include real-time data observation of operational components on the pilot and burner apparatus 200, and the capability to maintain operational firmware and/or software from a remote location. The pilot and burner system 202 can include programmable logic circuit status reporting, computer maintenance diagnostic, remote recording and viewing of data, wireless network integration, remote software downloading, service data uploading, progressive run timers and counters, trends and archives, alarm history, configuration access, and the like.

The flame control system 260 can be configured to be communicably coupled to the pilot and burner apparatus 200 through cables, through wireless communication devices, or through a combination of wired and wireless communication devices or configurations. An electrical connector 241 can be included to communicably couple the flame control system 260 to the electrical enclosure 240. The electrical enclosure 240 can provide support and protection for electrical components of the pilot and burner apparatus 200. In certain implementations, the electrical enclosure 240 includes a wireless communication module configured to communicate with a remote system such as the flame control system 260. The wireless communication module can be configured to communicate using radio frequency signals and/or using standard wireless communication protocols including WiFi, BLUETOOTH, near-field communication, or the like. In some embodiments, the flame control system 260 is integrated into the pilot and burner apparatus 200. For example, the flame control system 260 can be included within the electrical enclosure 240. This can provide an apparatus that does not use external or remote systems to process information from the pilot and burner apparatus 200 and/or to control components on the pilot and burner apparatus 200. In some implementations, this can result in the removal of the electrical connector 241, further reducing the complexity and difficulty associated with installing and/or removing the pilot and burner apparatus 200.

The pilot and burner apparatus 200 includes a main fuel system 210 that includes a main fuel conduit 211, a main fuel inlet 212, a main fuel outlet 218, a pilot conduit connection 214, and a main fuel valve 216. The pilot and burner apparatus 200 includes a pilot fuel system 220 that includes a pilot fuel conduit 221, a pilot fuel inlet 222, and a pilot fuel valve 226. The pilot and burner apparatus 200 includes a pilot flame system 230 that includes a pilot flame tube 231, an air distribution system 232, a pilot outlet connection 236, a flame detection system 234, and an igniter device 238. The main fuel valve 216, the pilot fuel valve 226, the air distribution system 232, the flame detection system 234, and/or the igniter device 238 can be electrically coupled to the electrical enclosure 240 and/or to electrical components within the electrical enclosure 240. In some embodiments, the electrical enclosure 240 acts to combine the electrical cables into an output cable that can be coupled to the flame control system 260. In certain implementations, the electrical enclosure 240 includes electrical components configured to generate an electrical signal configured to be communicated over wires or wirelessly to the flame control system 260. The electrical components within the electrical enclosure 240 can also be configured to receive commands or signals from the flame control system 260 and to distribute the signals to the appropriate or targeted components of the pilot and burner apparatus 200. In some embodiments, the signals can be passed directly to the components of the pilot and burner apparatus 200 without further processing in the electrical enclosure 240. In certain embodiments, the electrical enclosure includes one or more electrical components to process signals from the flame control system 260 prior to sending signals to the one or more components of the pilot and burner apparatus 200.

The flame control system 260 can include a controller, data storage, and one or more modules configured to provide desired or programmed functionality to the pilot and burner apparatus 200. The flame control system 260 can be configured to control the igniter device to provide an ignition for fuel in the pilot flame tube 231. The flame control system 260 can be configured to control the main fuel valve 216 and/or the pilot fuel valve 226 to coordinate when the valves are open and/or closed or to control how open the valves are. The flame control system 260 can be configured to receive signals from the flame detection system 234 to verify the presence of a pilot flame. The flame control system 260 can be configured to allow an operator to light the pilot flame, to extinguish the pilot flame, to generate a flame by opening the main fuel valve 216 so that fuel flows out of the main fuel outlet 218 and into the fuel conduit 284 to be ignited by the pilot flame, and/or to extinguish the flame by closing the main fuel valve 216.

The pilot fuel valve 226 and/or the main fuel valve 216 can include a solenoid that actuates a valve or similar device between an open position and a closed position. In the open position, fuel is permitted to flow through the respective valve. In the closed position, gas may be inhibited from flowing through the valve. The pilot fuel valve 226 and/or the main fuel valve 216 may be configured such that it is normally closed when power is provided to the pilot and burner system 202. The valves 216, 226 may communicate with or be controlled by the flame control system 260. Methods of fuel control include but are not limited to a closed loop-feedback system to control the valve position. The valve position can be controlled to provide varying levels of fuel flow in the main conduit 211 and/or the pilot conduit 221.

The flame control system 260 and the pilot and burner apparatus 200 can be configured to effectuate a modification to a live fire or a controlled live fire. The flame control system 260 can be configured to increase, decrease, or stop, and combinations thereof, the fuel flow to the main fuel system 210 and/or the pilot fuel system 220 via the fuel valves 216, 226 subsequently causing an increase, a decrease, or a complete shutdown of the controlled, live fire.

In some embodiments, the flame control system 260 can be used with a remote control device, such as a dedicated remote control device, a smartphone, a table, a computer, or the like. The flame control system 260 can indicate the pilot and burner apparatus 200 is ready for use when the flame control system 260 has established communication with the remote control device and the flame control system 260 has recognized that the pilot flame is on (e.g., using the flame detection system 234). The remote control device can include operational indicators that include but are not limited to visual and audio indicators such as multicolored lights, tones of varying frequency, audio messages, text messages on the display, audio and text messages to external media, and combinations thereof.

The pilot and burner apparatus 200 includes connectors configured to connect fuel lines and electrical lines to the pilot and burner apparatus 200. For example, the pilot and burner apparatus 200 includes a fuel-in connector 213 configured to couple a fuel line to the main fuel system 210. The pilot and burner apparatus 200 includes a fuel-out connector 219 configured to couple the main fuel system 210 to the fuel pipe 284. The pilot flame tube 231 can be configured to have a smaller radius than the main burner pipe 282. In this way, the pilot flame tube 231 can be adjusted so that at least a portion of the pilot flame tube 231 is positioned within the main burner pipe 282. In this way, the pilot flame tube 231 and the main burner pipe 282 are not securely fastened or attached to one another, allowing for efficient installation and/or removal of the pilot and burner apparatus 200. As an example of how the pilot and burner apparatus 200 may be efficiently removed, it may only be necessary to remove connections at 213, 219, and 241 as well as any mechanical connectors. As described herein, the mechanical connectors can be configured to be removed without the use of tools. Advantageously, the removal of the pilot and burner apparatus 200 can be accomplished without tools in a relatively little amount of time.

Figure 3A:
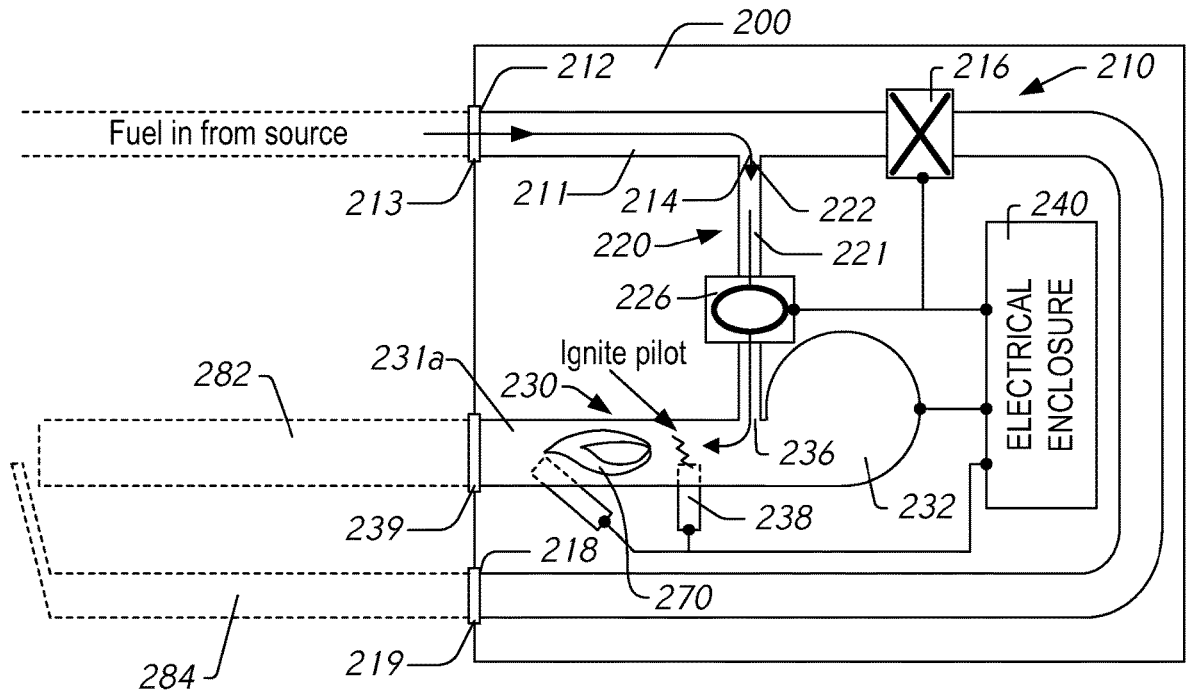
FIGS. 3A-3B illustrate a functional block diagram showing operational phases of the example pilot and burner system illustrated in FIG. 2A.
Figure 3B:
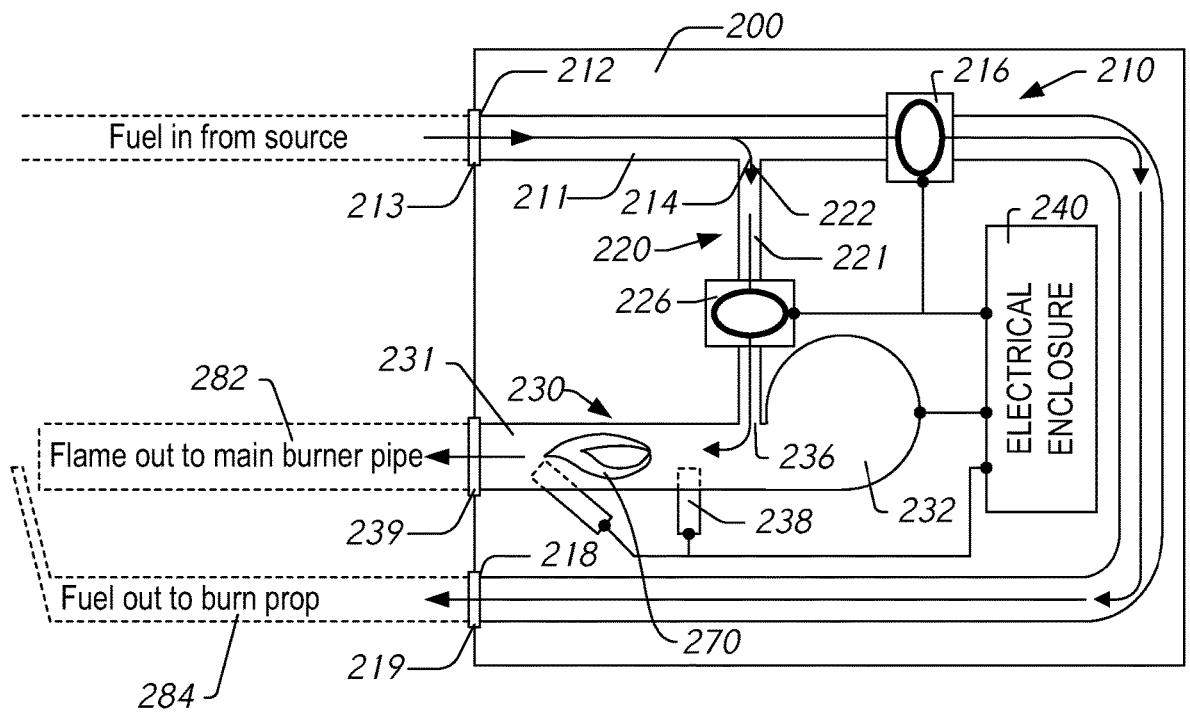

FIGS. 3A-3B illustrate operational phases of the example pilot and burner system 200 illustrated in FIG. 2. With reference to FIG. 3A, in a pilot phase the flame control system 260 is configured to control the pilot and burner apparatus 202 to close the main fuel valve 216 to inhibit the flow of fuel out of the main fuel outlet 218. The flame control system 260 is configured to open the pilot fuel valve 226 so that at least a portion of the flow of fuel in the main fuel conduit 211 passes through the pilot fuel conduit 221 and enters the pilot flame tube 231 through the pilot outlet connection 214. The flame control system 260 generates a spark within the pilot flame tube 231 with the ignition device 238 to ignite fuel in the pilot flame tube 231 to generate a pilot flame 270. The flame control system 260 can receive measurements from the flame detection system 234 and determine whether the pilot flame 270 has ignited based on the received measurements. In certain embodiments, the pilot fuel system 220 includes a pilot fuel regulator (not shown) to regulate the fuel pressure in the pilot fuel system 220.

With reference to FIG. 3B, in a burn phase the flame control system 260 is configured to control the pilot and burner apparatus 200 to open the main fuel valve 216 so that at least a portion of the flow of fuel from the fuel source exits the main fuel conduit 211 through the main fuel outlet 218. The fuel exiting the main fuel outlet 218 can be directed or coupled to a main burner fuel conduit 284. The fuel in the main burner conduit 284 can be ignited by the pilot flame 270 in the man burner pipe 282 wherein the flame is provided by pilot flame tube 231 coupled to or situated within the main burner pipe 282. The flame control system 260 can be further configured to regulate and/or modulate the amount of fuel and/or fuel pressure to control aspects of the flame provided at the main burner pipe 282. The main burner pipe 282 can be directed to a training structure to provide a controlled fire for firefighting training.

Additional Example Embodiments of Pilot and Burner Apparatuses

FIGS. 4A-4E illustrate various views of another example pilot and burner apparatus 400. FIG. 4F illustrates an exploded view of the pilot and burner apparatus 400. The pilot and burner apparatus 400 is similar to the pilot and burner apparatus 100 described herein with reference to FIGS. 1A-1D. The pilot and burner apparatus 400 includes a main fuel system 410, a pilot fuel system 420, a pilot combustion system 430, electrical components 440, and support structure 450. It should be noted that the pilot and burner apparatus 400 is illustrated without electrical cables that connect to components of the apparatus 400. However, it is to be understood that these cables are included in the apparatus 400 to convey electrical signals to the appropriate components.

The main fuel system 410 includes a main fuel conduit 411, a main fuel inlet 412, a pilot conduit connection 414, main fuel valves 416a, 416b, and a main fuel outlet 418. The pilot fuel system 420 includes a pilot fuel conduit 421, a pilot fuel inlet 422, a pilot fuel regulator 424, a pilot fuel gauge 425, and pilot fuel valves 426. The pilot flame system 430 includes a pilot flame tube 431, an air distribution system 432, a flame detection system 434, a pilot output connection 436, and an igniter device 438. The air distribution system 432 can be controlled through electrical connector 433, for example, configured to receive electrical signals. The electrical components 440 include the electrical enclosure and electrical connectors 442. A main electrical connector 441 can be configured to electrically couple to a control or main signal cable configured to convey electrical signals to and from the apparatus 400. The support structure 450 is configured to provide support to one or more components of the main fuel system 410, the pilot fuel system 420, and/or the pilot flame system 430.

Figure 4A:
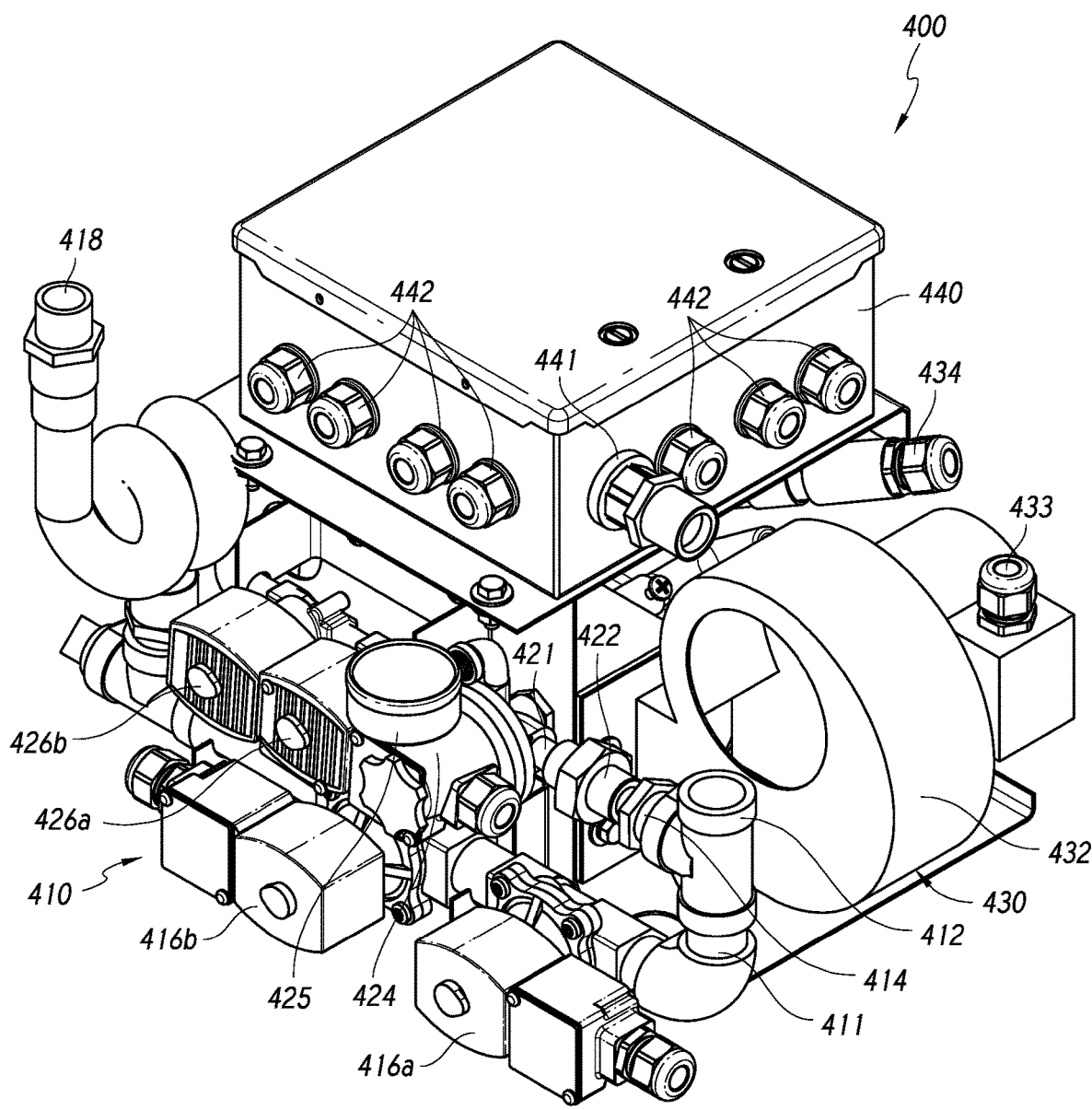
FIGS. 4A-4E illustrate various views of another example pilot and burner apparatus.
Figure 4B:
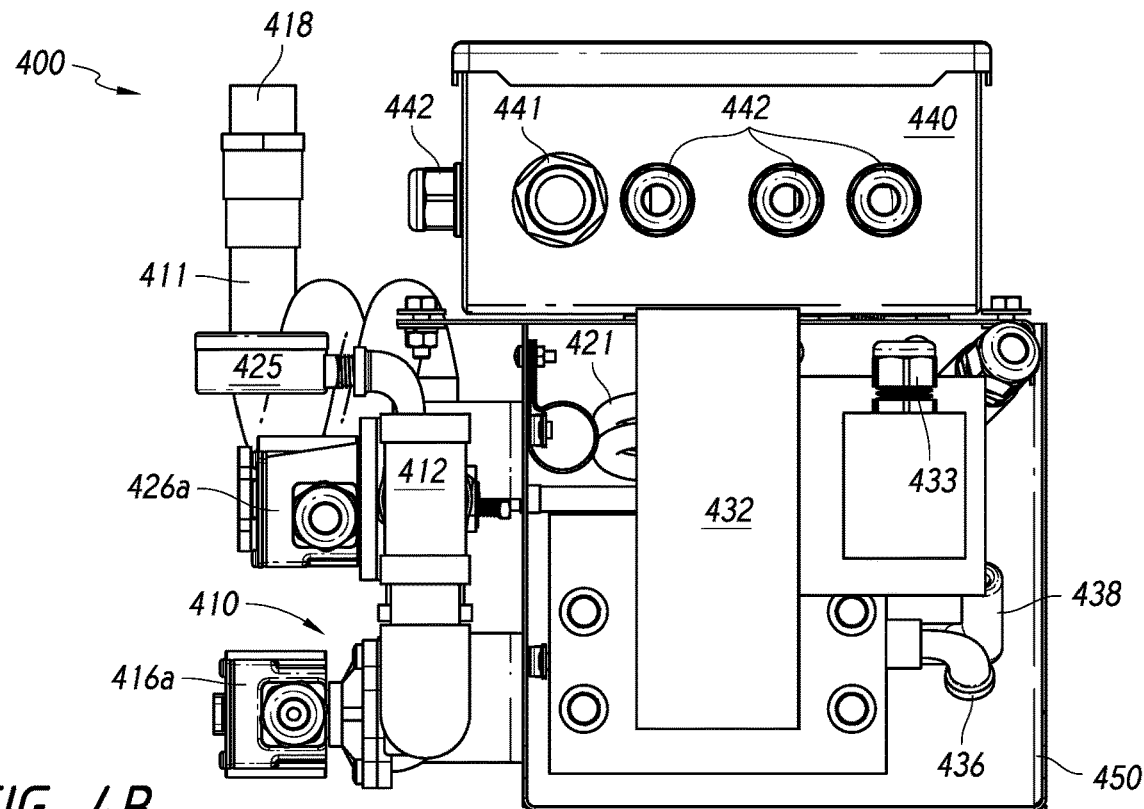
Figure 4C:
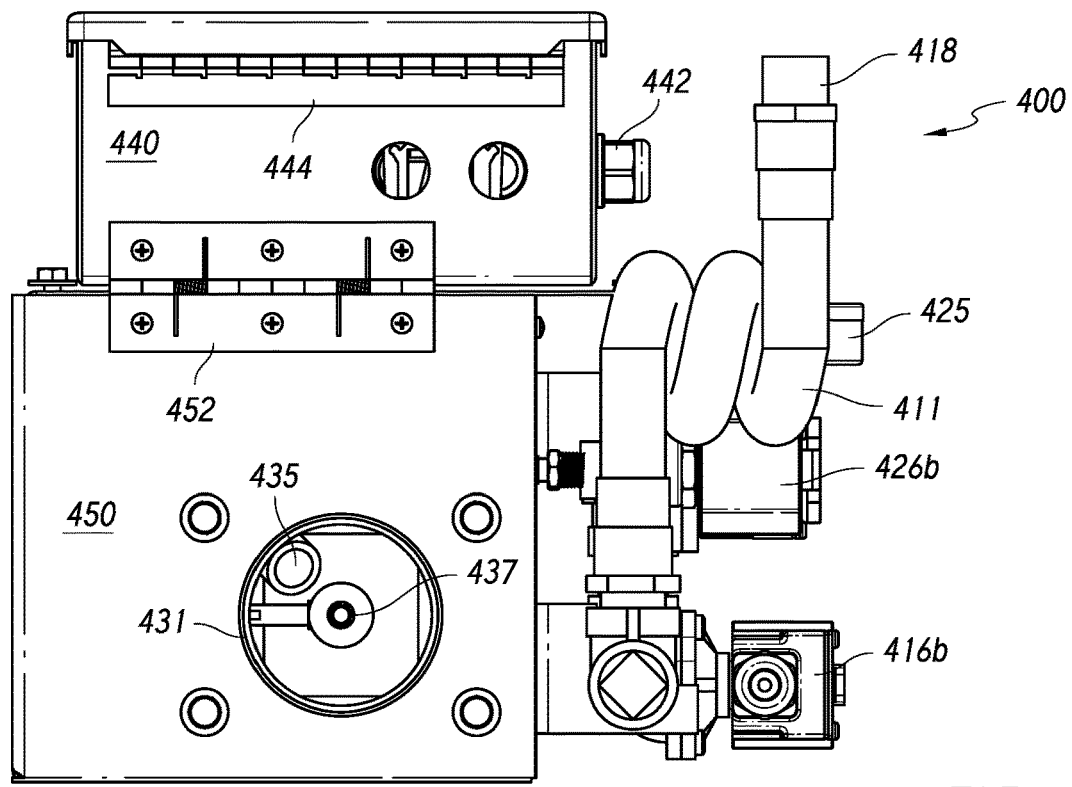
Figure 4D:
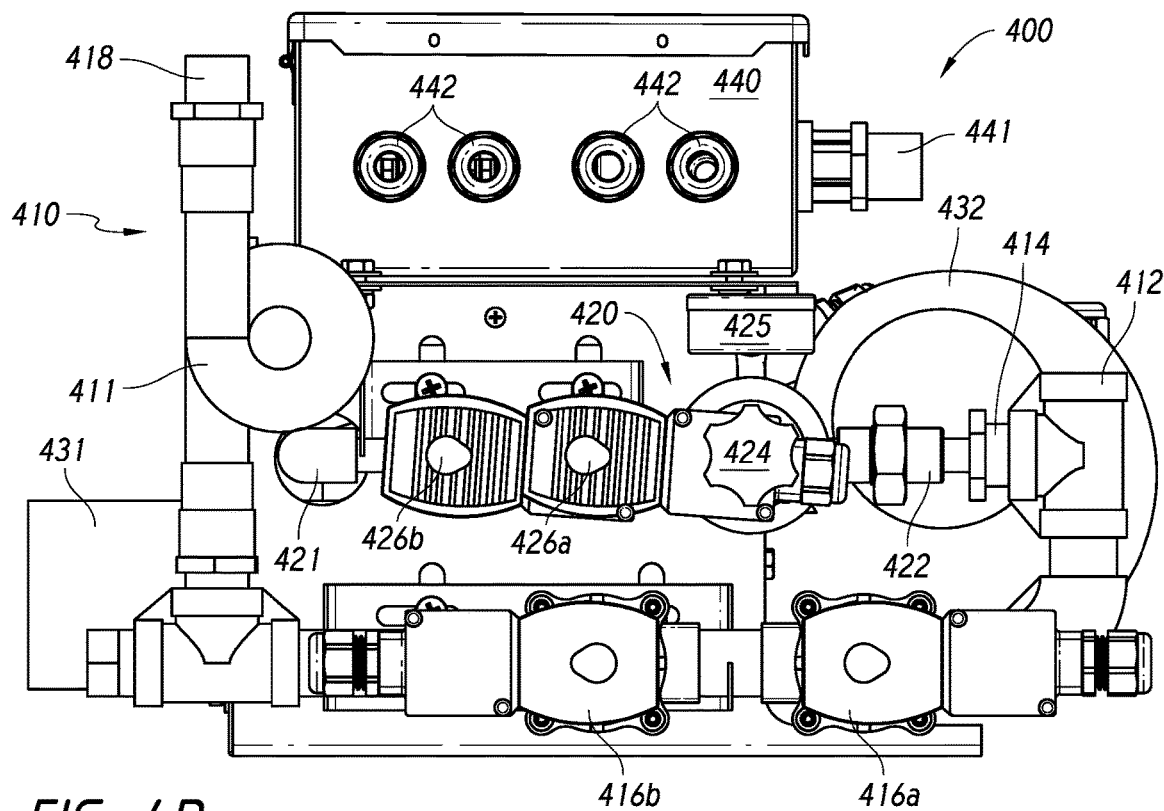
Figure 4E:
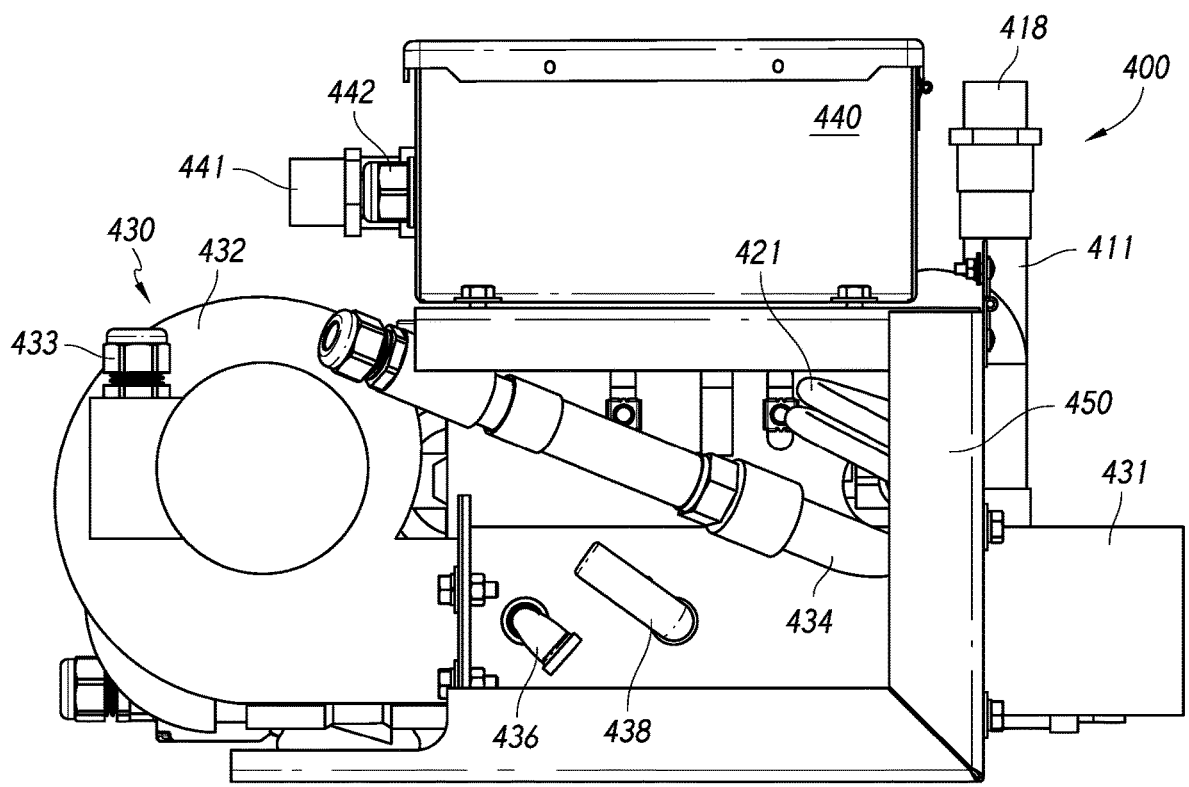
Figure 4F:
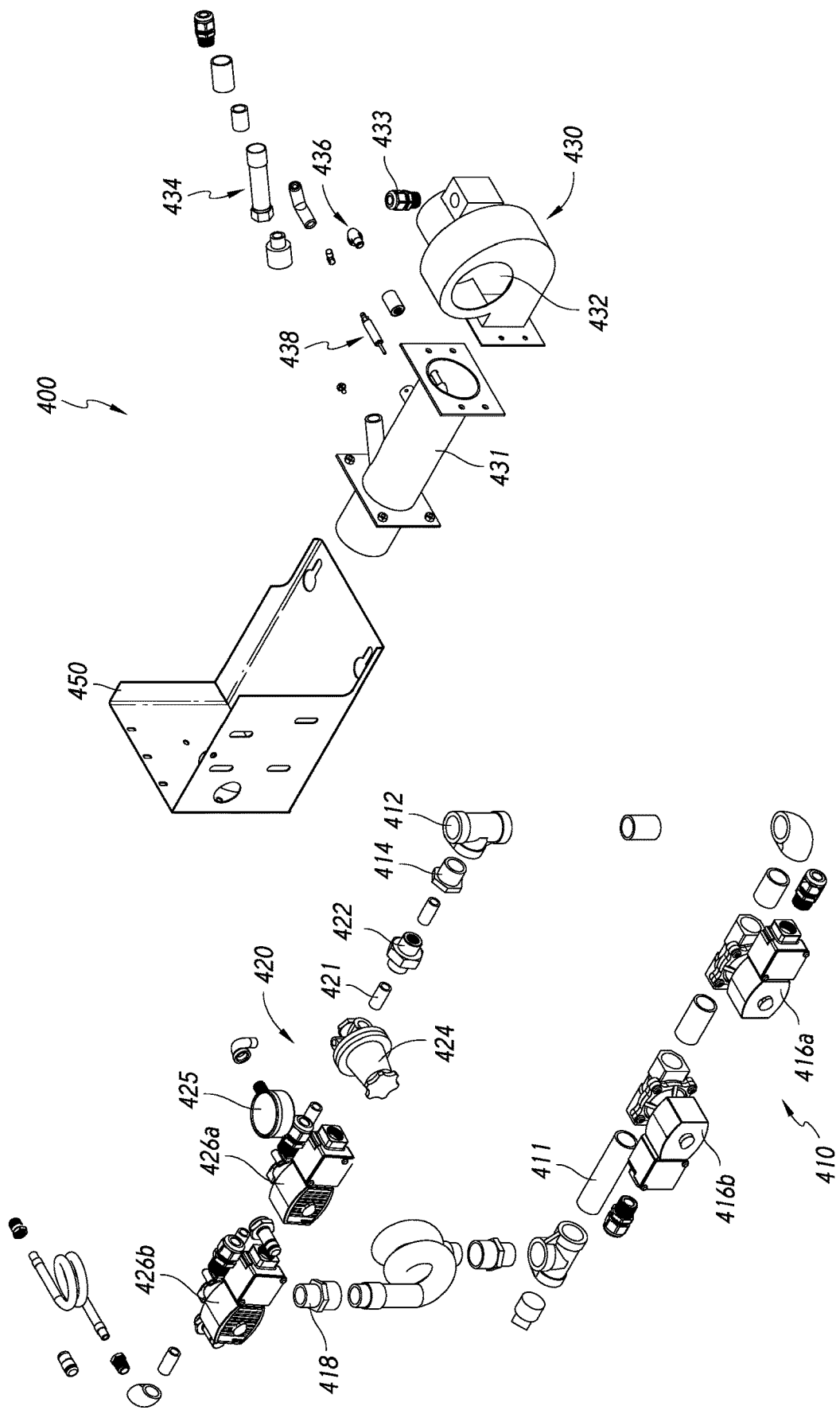
FIG. 4F illustrates an exploded view of components of the example pilot and burner apparatus illustrated in FIGS. 4A-4E.

FIG. 4C includes a view of a sensor housing 435 configured to house a sensor of the flame detection system 434. The sensor housing 435 can protrude at least partially into the pilot flame tube 431. The apparatus 400 can also include a pilot combustion system 437 configured to support the igniter device 438 within the pilot flame tube 431 to ignite fuel delivered by the pilot fuel system 420.

The electrical enclosure 440 can include a hinge 444 to allow the enclosure 440 to be opened to provide access to connectors and/or other components within the enclosure 440. In some embodiments, the electrical enclosure 440 is coupled to the structural components 450 using a hinge 452 to allow the electrical enclosure 440 to be moved, providing access to components within the structural components normally obscured by the electrical enclosure 440.

Figure 5A:
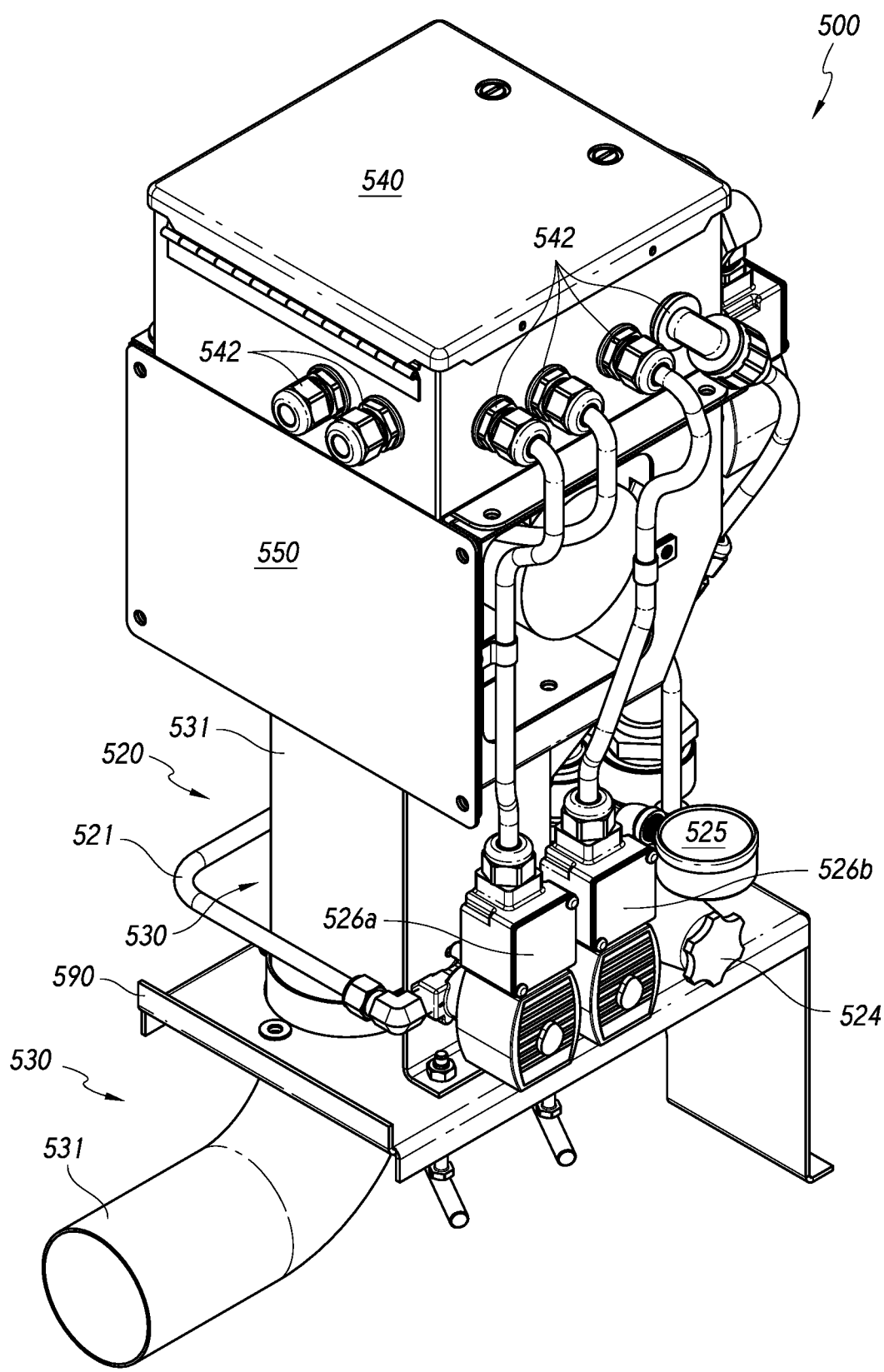
FIGS. 5A-5B illustrate various views of another example pilot and burner apparatus as installed in a training structure.
Figure 5B:
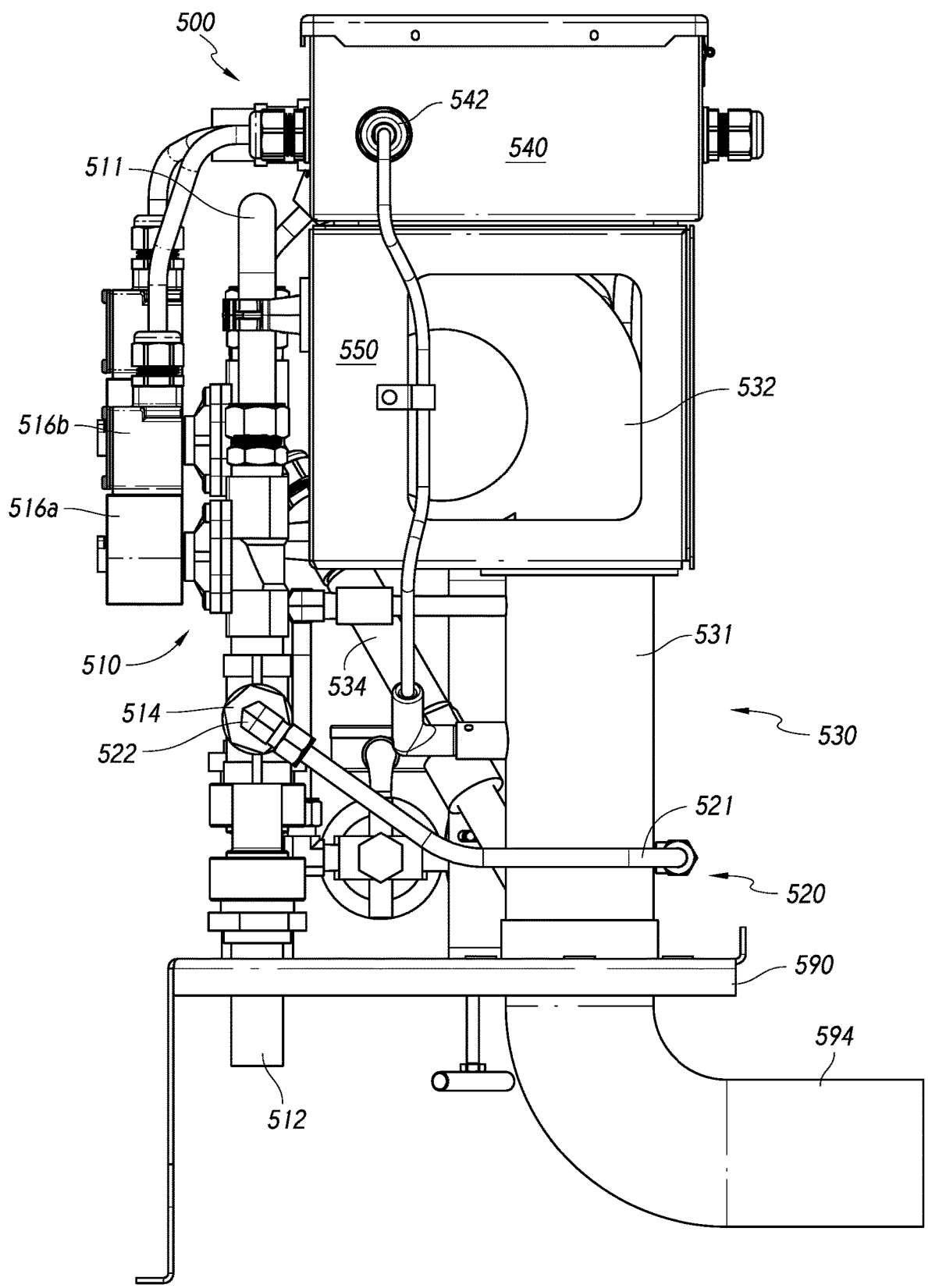

FIGS. 5A-5B illustrate various views of another example pilot and burner apparatus 500 configured to attach to a mounting interface 590. The mounting interface includes a mounting structure 592 having a main burner pipe 594. The pilot and burner apparatus 500 is similar to the pilot and burner apparatus 100 described herein with reference to FIGS. 1A-1D and the pilot and burner apparatus 400 described herein with reference to FIGS. 4A-4F. The pilot and burner apparatus 500 includes a main fuel system 510, a pilot fuel system 520, a pilot combustion system 530, electrical components 540, and support structure 550. The pilot fuel system 520 includes a pilot fuel conduit 521, a pilot fuel inlet 522, a pilot fuel regulator 524, a pilot fuel gauge 525, and pilot fuel valves 526. The pilot flame system 530 includes a pilot flame tube 531, an air distribution system 532, a flame detection system 534, a pilot output connection 536, and an igniter device 538. The electrical components 540 include the electrical enclosure and electrical connectors 542. The support structure 550 is configured to provide support to one or more components of the main fuel system 510, the pilot fuel system 520, and/or the pilot combustion system 530 and to connect or attach to the mounting interface 590.

Figure 5C:
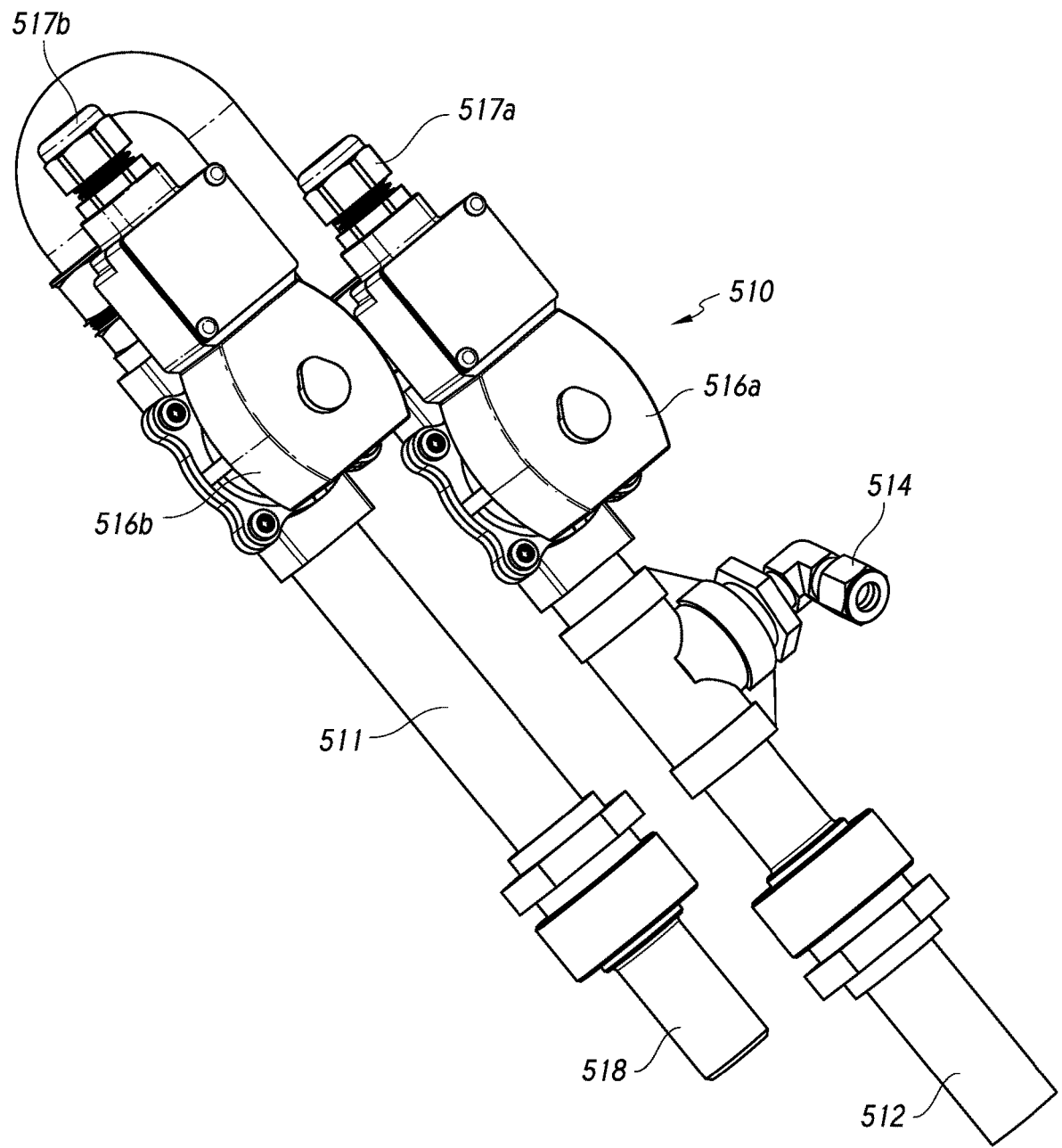
FIG. 5C illustrates a main fuel conduit of the example pilot and burner apparatus illustrated in FIGS. 5A-5B.

FIG. 5C illustrates a main fuel system 510 of the example pilot and burner apparatus 500 illustrated in FIGS. 5A-5B. The main fuel system 510 includes a main fuel conduit 511, a main fuel inlet 512, a pilot conduit connection 514, main fuel valves 516a, 516b, and a main fuel outlet 518. The main fuel valves 516a, 516b, as with the pilot fuel valves 526a, 526b, are provided in sequence to provide redundancy for safety purposes. In some embodiments, the pilot and burner apparatus 500 includes only one main fuel valve 516a and/or only one pilot fuel valve 526a. In certain implementations, more fuel valves can be included on the pilot and burner apparatus 500. The main fuel valves 516a, 516b can be controlled through valve electrical connectors 517a, 517b that are connected to a control system through, for example, the electrical components 540 and/or any other suitable control system.

Example Training Structures Incorporating Pilot and Burner Apparatuses

Figure 6A:
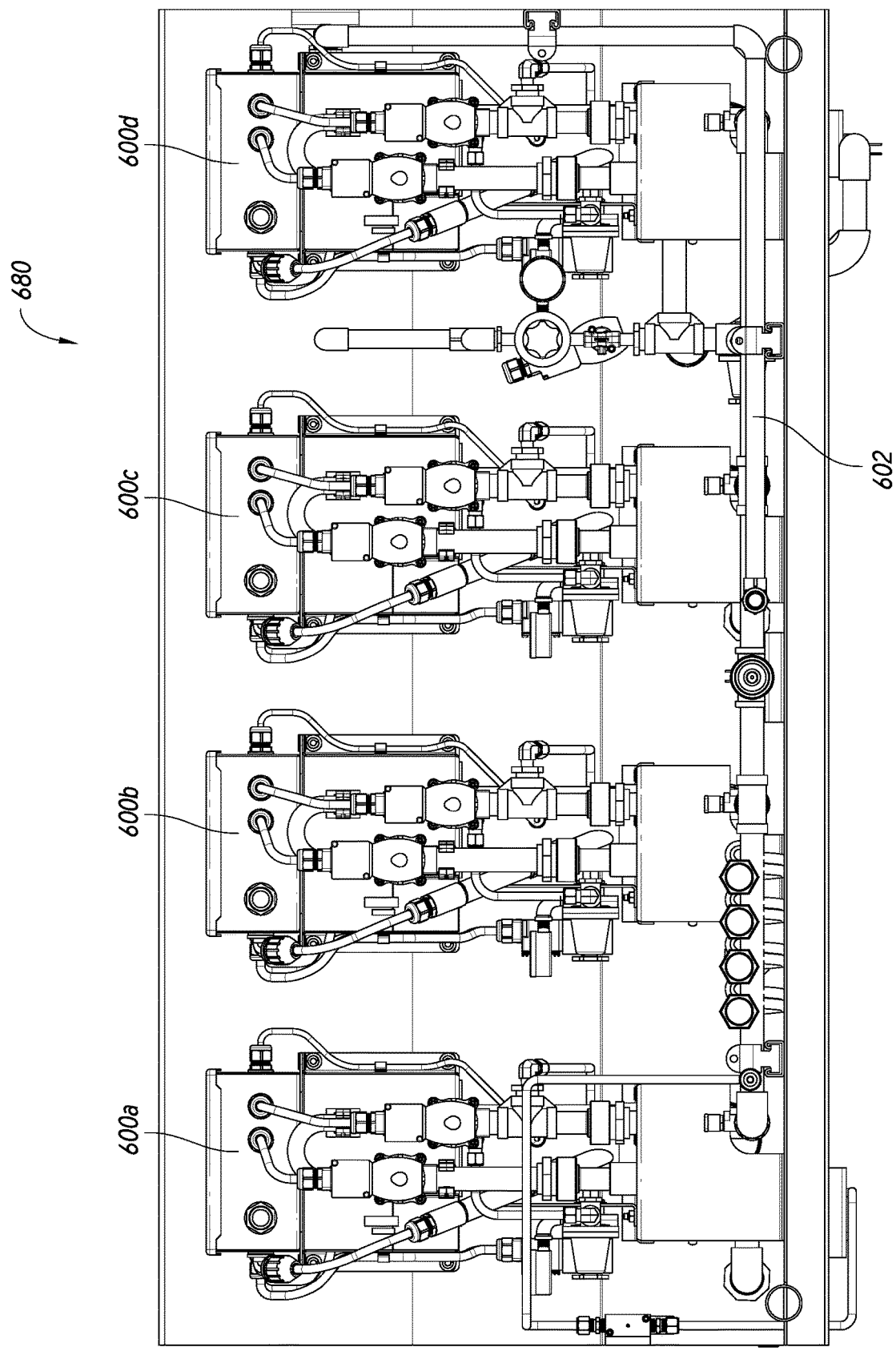
FIGS. 6A-6B illustrate various views of infrastructure for an example fire training prop with four pilot and burner apparatuses configured to provide fire to four regions of the prop.
Figure 6B:
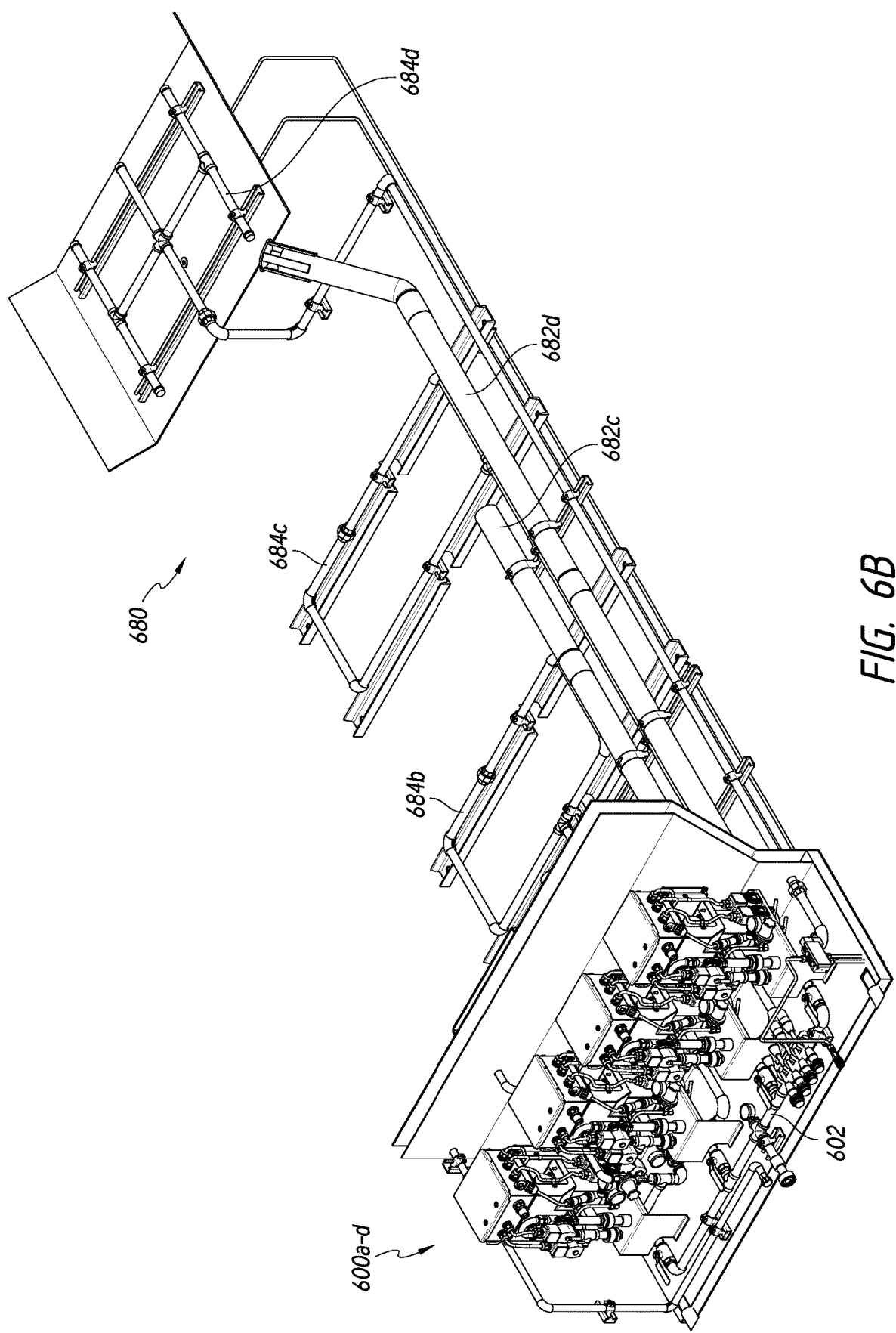

FIGS. 6A-6B illustrate various views of infrastructure for an example fire training prop 680 with four pilot and burner apparatuses 600a-600d configured to provide fire to four regions of the prop 680. In certain implementations, each pilot and burner apparatus 600a-600d can receive fuel from a single fuel source. The fuel source can be configured to regulate the fuel pressure delivered to the pilot and burner apparatuses 600a-600d. For example, the fuel source conduit 602 can be configured to deliver fuel from a fuel source to each pilot and burner apparatus 600a-600d.

The prop 680 can include a structure to support the pilot and burner apparatuses 600a-600d and, for each pilot and burner apparatus 600a-600d, a main burner pipe 682a-682d. The main burner pipes 682a-682d can each comprise a pilot tube interface and a flame outlet to receive a pilot flame from a respective apparatus and deliver the flame to a particular region of the prop 680. In addition, fuel conduits 684a-684d can be configured to deliver a supply of fuel from an outlet of a main fuel system of the respective apparatus 600a-600d to a targeted region of the burn prop 680. For each pilot and burner apparatus 600a-600d, a pilot flame in the pilot tube is configured to ignite the fuel at a targeted location in the prop 680 by blowing the pilot flame out of the end of a main burner pipe 682 where it combines with fuel provided from the respective fuel conduit 684. By controlling the valves in the apparatus, the flow of fuel can be controlled at the targeted location in the burn prop 680, thus allowing the plurality of apparatuses 600a-600d to control the fires at the respective locations in the prop 680. The combination of the respective burner pipes 682a-682d and fuel conduits 684a-684d are configured to provide a flame at different regions of the training prop 680 to simulate the training structure being on fire. Using the training prop 680, a training scenario can be configured to provide independently controllable zones to allow for simulation of spreading fires and the like. For example, fuel pipes 684b-684d and valves in the associated apparatuses 600a-600d can be used to deliver fuel to shape and/or control the magnitude of the fire in respective zones of the fire prop 680.

Figure 7:
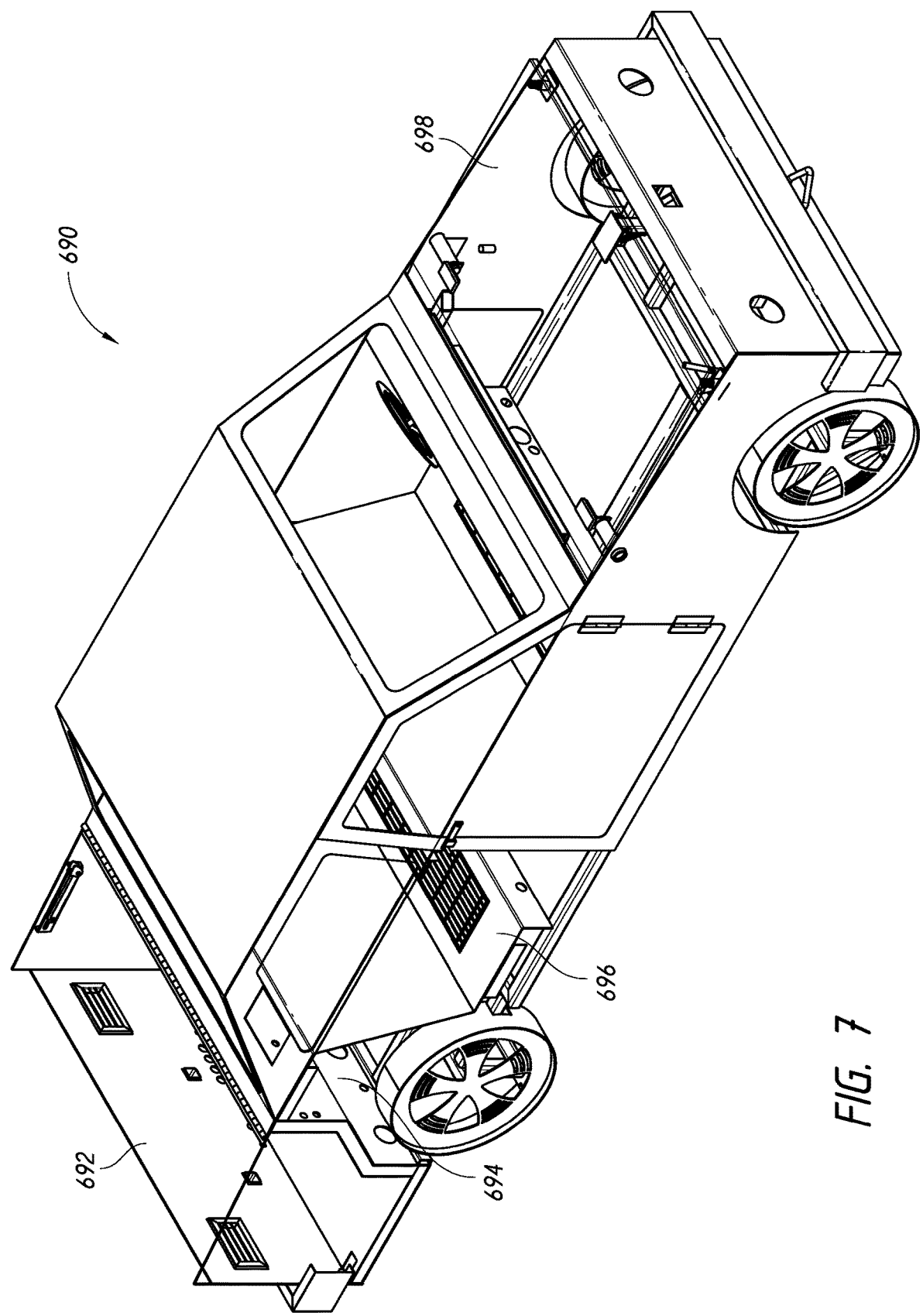
FIG. 7 illustrates an isometric view of a fire training prop configured to resemble a car, the fire training prop incorporating the infrastructure illustrated in FIGS. 6A-6B.

FIG. 7 illustrates an isometric view of a fire training prop 690 configured to resemble a car, the fire training prop 690 incorporating the infrastructure illustrated in FIGS. 6A-6B. The fire training prop 690 can be configured to resemble other structures, such as airplanes, helicopters, dumpsters, houses, kitchens, or the like. The fire can be simulated, using the respective pilot and burner apparatuses 600a-600d mounted in a trunk area 692 of the car, to appear in a wheel/brake area of the car 694, to appear in a passenger area 696 of the car, and/or to appear in an engine compartment 698 of the car. The fire can be configured to spread from area to area or the fire can be configured to start in a plurality of zones at the same time.

Figure 8:
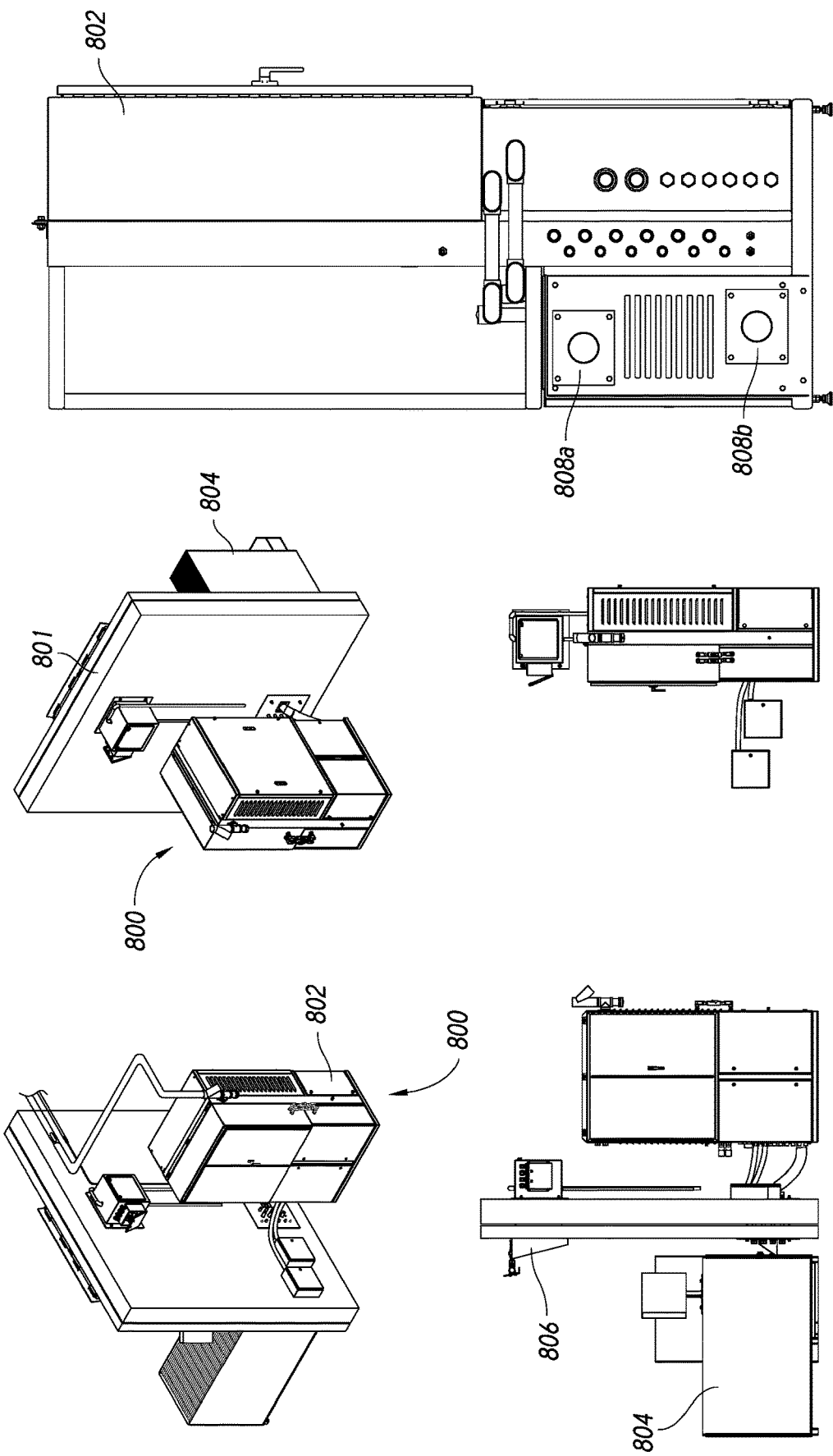
FIG. 8 illustrates an example pilot and burner apparatus incorporated into fire training system, the example pilot and burner apparatus configured to provide fire to a burn prop and to a flashover prop.

FIG. 8 illustrates an example pilot and burner apparatus incorporated into a fire training system 800, the example pilot and burner apparatus configured to provide fire to a burn prop 804 and to a flashover prop 806. The training system 800 can include training structures that include a wall 801, a ceiling (not shown), and a flame outlet 806 (e.g., a flashover or rollover prop) to direct the flame delivered from the main burner pipe along a ceiling of the training structure. The pilot and burner apparatus can be positioned within a cabinet 802 positioned in another room or another area away from the training structures (e.g., remotely positioned). In some embodiments, the pilot and burner apparatus can be at least 5 feet away from the training structures, at least 10 feet away from the training structures, at least 20 feet away, or at least 30 feet away. The cabinet 802 can include multiple components in addition to the pilot and burner apparatus. For example, the cabinet 802 can include one or more smoke discharge systems 808a, 808b, compressed air or gas systems, and one or more electrical connections to control the pilot and burner apparatus and/or other components of the training system 800.

In some embodiments, the training system 800 can be used within one or more dedicated "burn rooms" for the practice of igniting various props. The training system 800 incorporating one or more pilot and burner apparatuses can be used to provide controlled flames to a plurality of structures and/or separate burn rooms. The pilot and burner apparatuses can be positioned outside of the respective structures and/or burn rooms (e.g., remotely positioned). The structures can include items of furniture and fixtures and equipment, and can be made of fireproof materials, such as steel, in the shape of the represented combustible item.

Figure 9:
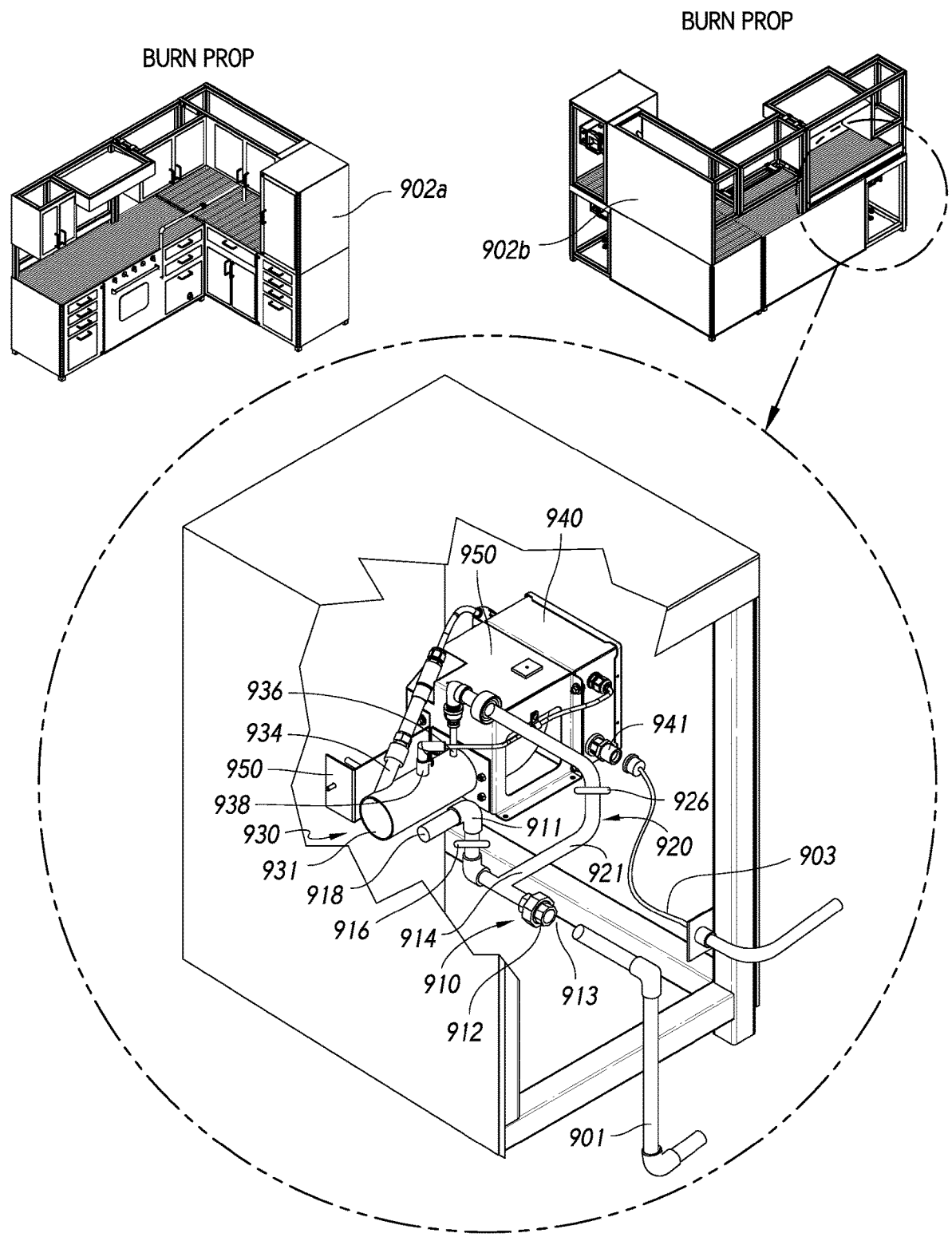
FIG. 9 illustrates an example pilot and burner apparatus incorporated into a burn prop.

FIG. 9 illustrates an example pilot and burner apparatus 900 incorporated into a burn prop 902 simulating a kitchen environment. As illustrated, the pilot and burner apparatus 900 is included within the burn prop 902. However, it is to be understood that the pilot and burner apparatus 900 can be positioned outside of the burn prop 902.

The pilot and burner apparatus 900 can be configured to receive electrical signals through a multi-pin conductor receptacle 941 on the end of an electrical cable, such as from a flame control system that is remote relative to the location of the burn prop 902. The term remote as used here can be used to indicate that the system is not integral with the pilot and burner apparatus 900 such that communication with the pilot and burner apparatus 900 is accomplished with a cable connected to the electrical components 940 or through wireless communication with a wireless module within the electrical components 940.

The pilot and burner apparatus 900 is similar to the other embodiments of the pilot and burner apparatuses described herein with reference to FIGS. 1, 4, and 5. The pilot and burner apparatus 900 includes a main fuel system 910, a pilot fuel system 920, a pilot combustion system 930, electrical components 940, and support structure 950. The main fuel system 910 includes a main fuel conduit 911, a main fuel inlet 912, a pilot conduit connection 914, main fuel valve 916, and a main fuel outlet 918. The pilot fuel system 920 includes a pilot fuel conduit 921, a pilot fuel inlet 922, a pilot fuel regulator 924, a pilot fuel gauge 925, and pilot fuel valves 926. The pilot flame system 930 includes a pilot flame tube 931, an air distribution system 932, a flame detection system 934, a pilot output connection 936, and an igniter device 938. The electrical components 940 include the electrical enclosure and electrical connectors 942. The support structure 950 is configured to provide support to one or more components of the main fuel system 910, the pilot fuel system 920, and/or the pilot combustion system 930.

The pilot and burner apparatus 900 can be installed in the burn prop 902 by mechanically latching the support structure 950 to a complementary mounting structure within the prop 902. The latches used to secure the support structure can be configured to be installed and/or removed without the use of tools. Installation of the pilot and burner apparatus 900 can include attaching a fuel source line 901 to the main fuel inlet 912 using a quick connector 913. Installation of the pilot and burner apparatus 900 can include connecting an electrical line 903 to the electrical components 940 using connector 941. Installation of the pilot and burner apparatus 900 can include connecting the main fuel outlet 918 to a main burner fuel conduit (not shown) using a quick connector (not shown). The main burner pipe (not shown) can be positioned to overlap at least a portion of the pilot flame tube 931 to complete installation of the pilot and burner apparatus 900.

Figure 10A:
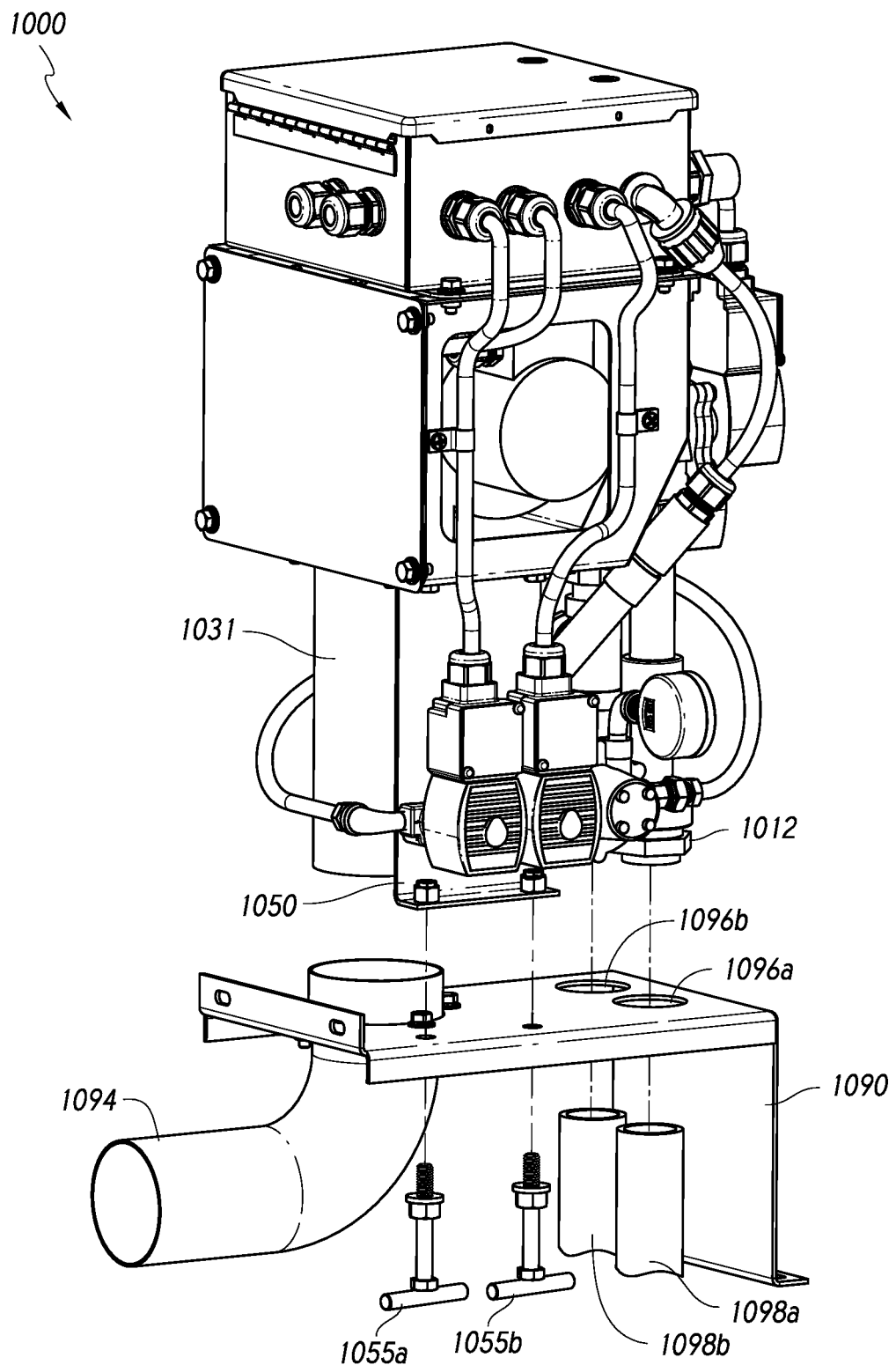
FIGS. 10A and 10B illustrate an example pilot and burner apparatus with features that facilitate installation and removal of the apparatus in a training structure.
Figure 10B:
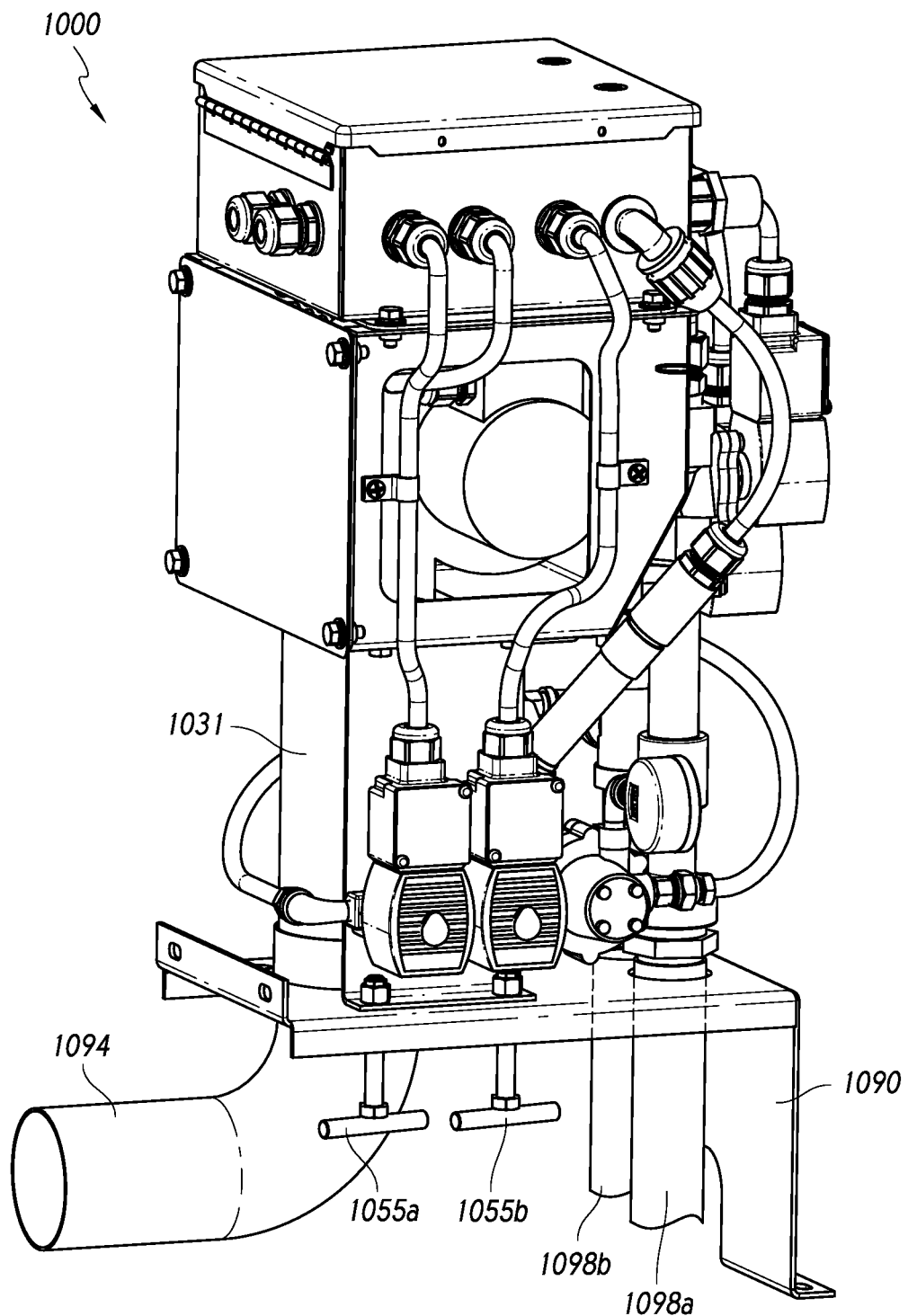

FIGS. 10A and 10B illustrate installation of an example pilot and burner apparatus 1000 with features that facilitate installation and removal of the apparatus in a training structure. For example, a mounting interface 1090 can be configured to allow T-handles 1055a, 1055b to pass through the mounting interface to attach to corresponding features on the a support structure 1050 of the apparatus 1000. When the T-handles are fastened to the support structure 1050 of the apparatus 1000, the apparatus 1000 can be configured to be secured to the mounting interface 1090.

To install the apparatus 1000, for example, in a burn prop having the mounting interface 1090, the apparatus 1000 is positioned so that a pilot flame tube 1031 is positioned within or around the main burner pipe 1094 and so that the main fuel inlet 1012 and main fuel outlet 1018 align respectively with passages 1096a, 1096b. Once aligned, fasteners 1055a, 1055b can be secured to the support structure 1050, an inlet fuel pipe 1098a can be connected to a main fuel inlet 1012, and an outlet pipe 1098b can be connected to a main fuel outlet 1018.

Figure 11:
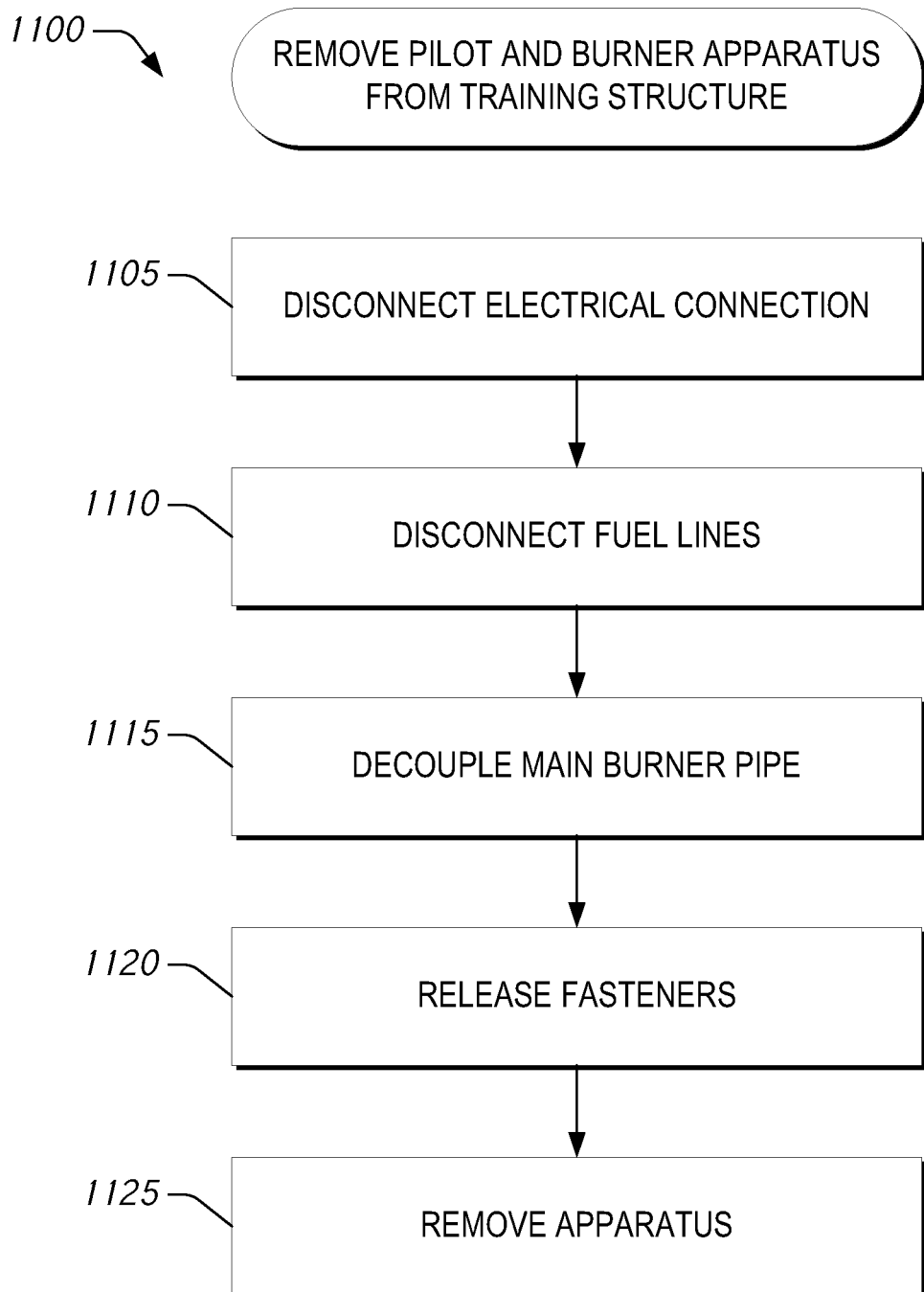
FIG. 11 illustrates a flow chart of an example method for removing a pilot and burner apparatus from a training structure.

FIG. 11 illustrates a flow chart of an example method 1100 of removing a pilot and burner apparatus from a training structure. The method 1100 can be performed without the use of tools. The method 1100 can be accomplished in less than about 10 minutes, less than about 5 minutes, or less than about 2 minutes. The method 1100 can be used to remove a pilot and burn apparatus by removing or disconnecting 3 or fewer components, 4 or fewer components, 5 or fewer components, 7 or fewer components, or 10 or fewer components.

In block 1105, an electrical connector coupling electrical components of the pilot and burner apparatus to electrical components remote from the pilot and burner apparatus is disconnected. The electrical connector can be a custom-designed connector, such as a 10-pin connector, that can be connected or disconnected by hand, without the use of tools.

In block 1110, fuel lines to the pilot and burner apparatus are disconnected. For example, a line from a fuel source can be disconnected from an inlet for a main fuel system of the pilot and burner apparatus. Similarly, a burner pipe fuel conduit can be disconnected from an outlet of the main fuel system of the pilot and burner apparatus. Each conduit connection to the main fuel system can be accomplished using quick connectors or other connectors that can be attached and/or removed efficiently and/or without the use of tools.

In block 1115, a main burner pipe is decoupled from the pilot and burner apparatus. In certain implementations, a pilot tube of the pilot and burner apparatus has a diameter that differs from the main burner pipe. Coupling the pilot tube to the main burner pipe can include, in such embodiments, positioning the pilot tube and the main burner pipe so that a portion of one is inside a portion of the other. For example, the pilot tube can be configured to slide over a portion of the main burner pipe. In such embodiments, the main burner pipe and the pilot tube are not attached to one another or physically connected to one another. In some embodiments, the sizes of the inner and outer diameters of the respective tubes can be such that friction can secure one within the other. In such embodiments, the friction can be sufficiently small so that a person can decouple the respective tubes without the use of tools (e.g., by hand).

In block 1120, mechanical fasteners attaching a support structure of the pilot and burner apparatus to a mounting structure can be released. The mechanical fasteners can be configured to be removable without the use of tools (e.g., by hand). In some embodiments, there are two mechanical fasteners. The number of mechanical fasteners can be greater than two. The mechanical fasteners can be, for example and without limitation, T-handles, clamps, clips, latch clamps, wingnuts, hand-tightened screws, hand-tightened nuts and bolts, a combination of these, or the like. In block 1125, the pilot and burner apparatus is removed.

Example Fuel and Ignition Systems of a Pilot and Burner Apparatus

Figure 12B:
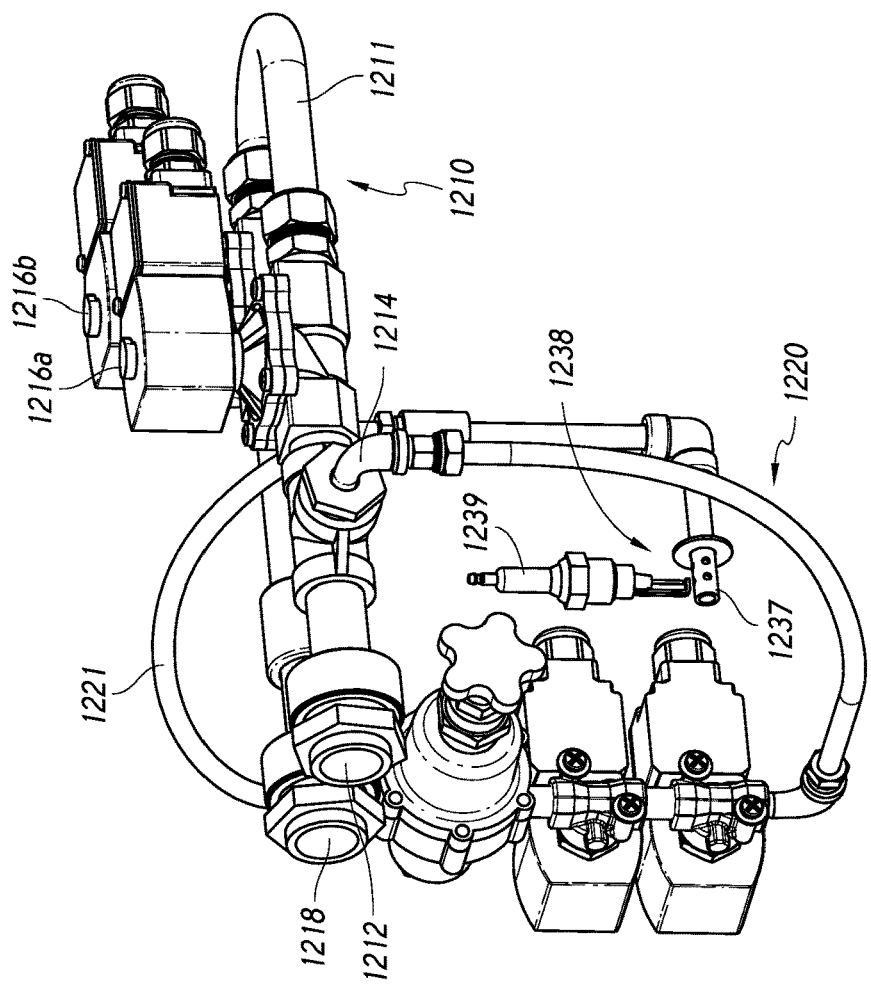
FIGS. 12A and 12B illustrate the combined main fuel system, the pilot fuel system, and the ignition system of an example pilot and burner apparatus.
Figure 12A:
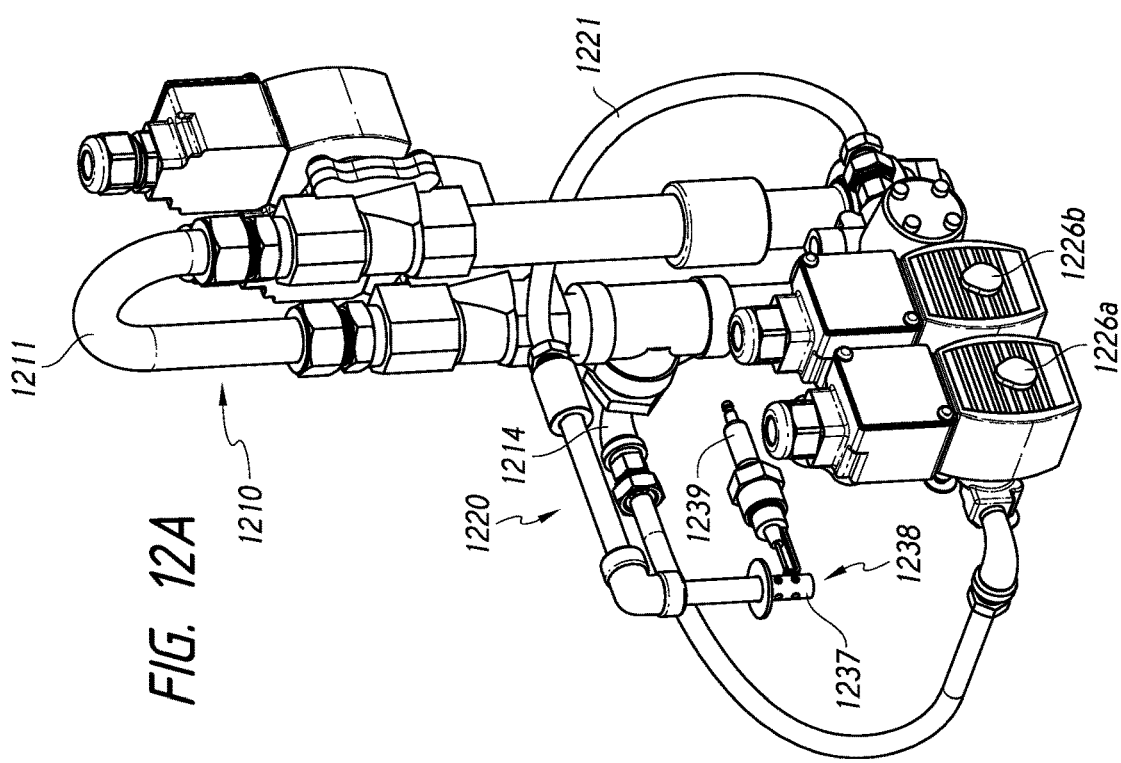

FIGS. 12A and 12B illustrate different views of the combined main fuel system 1210, the pilot fuel system 1220, and the ignition system 1238 of an example pilot and burner apparatus, such as the apparatuses described herein with reference to FIGS. 1, 4, and 5. The fuel and ignition systems are illustrated here decoupled from the other components of the pilot and burner apparatus to more clearly illustrate the interaction of the systems to control and generate flames for firefighting training.

The main fuel system 1210 receives fuel at the main fuel inlet 1212 and at least a portion of the received fuel flows into the pilot fuel system 1220 at the pilot conduit connection 1214. The main fuel valves 1216a, 1216b control the flow of fuel from the main fuel inlet 1212 to the main fuel outlet 1218. Within the pilot fuel system 1220, the pilot valves 1226a, 1226b control the flow of fuel through the pilot fuel system 1220 (e.g., from the main fuel system 1210 to the ignition system 1238). When the pilot valves 1226a, 1226b are open, received fuel can flow from the pilot system 1220 in the pilot conduit 1221 to the ignition system 1238, at a pilot fuel outlet 1237. The fuel can be ignited at the pilot fuel outlet 1237 by the ignition device 1239. When the main valves 1216a, 1216b are open, received fuel can flow within the main fuel conduit 1211 from the main fuel inlet 1212 to the main fuel outlet 1218, for use in a burn prop or other training structure.

Numbered Example Embodiments

The following lists numbered example embodiments to illustrate various combinations of components within the scope of the present disclosure. However, the numbered example embodiments are not intended to limit the scope of the disclosure to the configurations in the examples. The disclosure extends to other modifications, variations, and configurations of components as disclosed herein.

1. An integrated pilot and burner apparatus for use in firefighting training, the apparatus comprising:
   a main fuel conduit comprising a main fuel inlet and a main fuel outlet, said main fuel conduit having a pilot fuel opening in fluid communication with a pilot fuel conduit;
   a main fuel valve coupled to the main fuel conduit and configured to control a flow of fuel in the main fuel conduit between the main fuel inlet and the main fuel outlet;
   a pilot flame tube comprising a pilot outlet and an air inlet, said pilot flame tube having a pilot fuel opening in fluid communication with said pilot fuel conduit;
   a pilot flame fan coupled to the pilot flame tube at the air inlet of the pilot flame tube so that, in use, the pilot flame fan delivers a flow of air into the pilot flame tube through the air inlet;

said pilot fuel conduit comprising:
- a pilot fuel inlet fluidly coupled to the pilot fuel opening of the main fuel conduit so that, in use, at least a portion of the flow of fuel in the main fuel conduit is directed into the pilot fuel conduit; and
- a pilot fuel outlet fluidly coupled to the pilot fuel opening of the pilot flame tube so that, in use, at least a portion of a flow of fuel in the pilot fuel conduit is directed into the pilot flame tube;

a pilot fuel valve coupled to the pilot fuel conduit and positioned between the pilot fuel inlet and the pilot fuel outlet, the pilot fuel valve configured to control the flow of fuel in the pilot fuel conduit between the pilot fuel inlet and the pilot fuel outlet;

an ignition component mechanically coupled to the pilot flame tube so that, in use, the ignition component ignites fuel in the pilot tube; and a flame detection component mechanically coupled to the pilot flame tube so that, in use, the flame detection system generates electronic measurements corresponding to flame conditions within the pilot flame tube, wherein all of the components of the integrated pilot and burner apparatus fit within an envelope of 24 inches by 24 inches by 24 inches.

2. The integrated pilot and burner apparatus of Embodiment 1 further comprising a pilot regulator coupled to the pilot fuel conduit, the pilot regulator configured to regulate a fuel pressure in the pilot fuel conduit.

3. The integrated pilot and burner apparatus of any of Embodiments 1-2, wherein the integrated pilot and burner apparatus weighs less than or equal to 50 pounds.

4. The integrated pilot and burner apparatus of any of Embodiments 1-3 further comprising a secondary main fuel valve positioned between the main fuel valve and the main fuel outlet.

5. The integrated pilot and burner apparatus of any of Embodiments 1-4 further comprising a secondary pilot fuel valve positioned between the pilot fuel valve and the pilot fuel outlet.

6. The integrated pilot and burner apparatus of any of Embodiments 1-5, wherein the ignition component comprises:
an ignition coil; and
a flame igniter,
wherein the ignition coil is electrically coupled to the flame igniter, and
wherein the flame igniter is mechanically coupled to the pilot flame tube so that, in use, the flame igniter receives electric current from the ignition coil and generates a spark to ignite fuel in the pilot flame tube.

7. The integrated pilot and burner apparatus of any of Embodiments 1-6, wherein the flame detection component comprises an optical sensor configured to generate electrical signals corresponding to levels of electromagnetic radiation within the pilot flame tube.

8. The integrated pilot and burner apparatus of Embodiment 7, wherein the optical sensor comprises an ultraviolet sensor configured to generate electrical signals corresponding to levels of ultraviolet radiation within the pilot flame tube.

9. The integrated pilot and burner apparatus of any of Embodiments 1-8 further comprising a support structure configured to couple to one or more of the pilot flame tube, the main fuel conduit, and the pilot fuel conduit.

10. The integrated pilot and burner apparatus of Embodiment 9, wherein the support structure comprises mounting interface elements configured to securely mount the pilot and burner apparatus to a training structure without the use of tools.

11. The integrated pilot and burner apparatus of Embodiment 9 further comprising an electrical enclosure coupled to the support structure.

12. The integrated pilot and burner apparatus of Embodiment 11, wherein the ignition component comprises an ignition coil electrically coupled to a flame igniter, the ignition component positioned within the electrical enclosure.

13. A firefighting training system comprising:
an integrated pilot and burner apparatus comprising:
- a support structure;
- a main fuel conduit supported by the support structure, the main fuel conduit comprising a main fuel inlet and a main fuel outlet;
- a main fuel valve coupled to the main fuel conduit, the main fuel valve configured to control a flow of fuel in the main fuel conduit;
- a pilot flame tube supported by the support structure, the pilot flame tube comprising an air inlet and a pilot flame tube outlet;
- a pilot fuel conduit comprising a pilot fuel inlet fluidly coupled to an opening of the main fuel conduit and a pilot fuel outlet fluidly coupled to the pilot flame tube;
- a pilot fuel valve coupled to the pilot fuel conduit, the pilot fuel valve configured to control a flow of fuel in the pilot fuel conduit;
- an ignition component coupled to the pilot flame tube; and
- a flame detection component coupled to the pilot flame tube;

a fuel source fluidly coupled to the main fuel conduit of the pilot and burner apparatus to provide a flow of fuel in the main fuel conduit; and a flame control system electrically coupled to the pilot and burner apparatus, wherein, in a pilot phase, the flame control system is configured to control the pilot and burner apparatus to:
- close the main fuel valve to inhibit the flow of fuel out of the main fuel outlet;
- open the pilot fuel valve so that at least a portion of the flow of fuel in the main fuel conduit passes through the pilot fuel conduit and enters the pilot tube through the pilot outlet interface;
- generate a spark within the pilot tube with the ignition component to ignite fuel in the pilot tube to generate a pilot flame;
- receive measurements from the flame detection component; and
- determine that the pilot flame has ignited based on the received measurements; and wherein, in a burn phase, the flame control system is configured to control the pilot and burner apparatus to open the main fuel valve so that at least a portion of the flow of fuel from the fuel source exits the main fuel conduit through the main fuel outlet.

14. The firefighting training system of Embodiment 13, wherein the fuel source is configured to deliver at least one of propane, butane, or natural gas to the integrated pilot and burner apparatus.

15. The firefighting training system of any of Embodiments 13-14 further comprising a main burner pipe coupled to the pilot flame tube, the main burner pipe configured to direct a pilot flame from the integrated pilot and burner apparatus to a targeted location within the firefighting training system.

16. The firefighting training system of Embodiment 15, wherein, in the burn phase:
fuel exiting the main fuel outlet is directed to the targeted location using a fuel pipe coupled to the main fuel outlet;
the pilot flame in the pilot tube is directed to an end of the main burner pipe at the targeted location using an air distribution system coupled to the pilot flame tube; and
a flame ignites when the fuel from the fuel pipe is ignited by the pilot flame leaving the main burner pipe.

17. The firefighting training system of any of Embodiments 13-16 further comprising a fuel source pressure regulator configured to regulate a fuel pressure from the fuel source.

18. The firefighting training system of Embodiment 17, wherein the integrated pilot and burner apparatus further comprises a pilot regulator coupled to the pilot fuel conduit, the pilot regulator configured to regulate a fuel pressure in the pilot fuel conduit.

19. The firefighting training system of any of Embodiments 13-18, wherein the flame control system is integrated into the integrated pilot and burner apparatus.

20. The firefighting training system of Embodiment 19, wherein the integrated pilot and burner apparatus further comprises an electrical enclosure coupled to the support structure and the flame control system is positioned within the electrical enclosure.

21. The firefighting training system of any of Embodiments 13-21, wherein the integrated pilot and burner apparatus further comprises a wireless communication module.

22. The firefighting training system of Embodiment 21, wherein the flame control system is configured to wirelessly communicate with the integrated pilot and burner apparatus through the wireless communication module.

23. An integrated pilot and burner apparatus comprising:
a support structure;
a main fuel conduit coupled to the support structure, the main fuel conduit comprising a main fuel inlet, a main fuel outlet, and a pilot conduit connection;
a main fuel valve coupled to the main fuel conduit, the main fuel valve configured to control a flow of fuel in the main fuel conduit;
a pilot flame tube coupled to the support structure, the pilot tube comprising an air inlet, a pilot outlet connection and a pilot flame tube outlet;
a pilot fuel conduit comprising a pilot fuel inlet fluidly coupled to the pilot conduit connection of the main fuel conduit and a pilot fuel outlet fluidly coupled to the pilot outlet connection of the pilot flame tube;
a pilot fuel valve coupled to the pilot fuel conduit, the pilot fuel valve configured to control a flow of fuel in the pilot fuel conduit;
an ignition component coupled to the pilot flame tube; and
a flame detection component coupled to the pilot flame tube.

24. A firefighting training apparatus comprising:
the pilot and burner apparatus of any of Embodiments 1-12 or 23;
a training structure; and
a fuel pipe fluidly coupled to the main fuel outlet of the pilot and burner apparatus;
a main burner pipe comprising a pilot flame inlet and a pilot flame outlet, the main burner pipe coupled to the training structure,
wherein:
the main burner pipe is configured to direct a pilot flame from the pilot flame tube to a targeted location within the firefighting training apparatus;
the fuel pipe is configured to convey fuel to the targeted location within the firefighting training apparatus;
the pilot and burner apparatus is configured to control a flow of fuel within the fuel pipe; and
the main burner pipe and the fuel pipe are configured to generate a flame at the targeted location in the training structure to simulate the training structure being on fire.

25. The firefighting training apparatus of Embodiment 24, wherein the training structure is shaped like a car.

26. The firefighting training apparatus of any of Embodiments 24-25, wherein the training structure comprises a wall, a ceiling, and a flame outlet to direct the flame delivered from the main burner pipe along a ceiling of the training structure.

27. The firefighting training apparatus of any of Embodiments 24-26, wherein the pilot and burner apparatus is positioned within the training structure.

28. The firefighting training apparatus of any of Embodiments 24-27, wherein the pilot and burner apparatus is positioned outside of the training structure.

29. The firefighting training apparatus of Embodiment 28, wherein the pilot and burner apparatus is positioned at least 10 feet from the training structure.

30. A firefighting training apparatus having a plurality of burn zones, the apparatus comprising:
a training structure comprising the plurality of burn zones;
a corresponding pilot and burner apparatus for each of the plurality of burn zones, each of the corresponding pilot and burner apparatuses according to the pilot and burner apparatus of any of Embodiments 1-12 or 23; and
a corresponding fuel pipe fluidly coupled to a main fuel outlet of a respective pilot and burner apparatus;
a corresponding main burner pipe comprising a pilot flame inlet and a pilot flame outlet, the pilot flame inlet coupled with a pilot flame tube of a respective pilot and burner apparatus,
wherein, for individual burn zones:
the main burner pipe is configured to direct a pilot flame from the pilot flame tube to the respective burn zone;
the fuel pipe is configured to convey fuel to the respective burn zone;
the respective pilot and burner apparatus is configured to control a flow of fuel within the fuel pipe; and
the main burner pipe and the fuel pipe are configured to generate a flame at the respective burn zone in the training structure to simulate the burn zone being on fire.

31. A fire training prop comprising non-flammable materials, the prop comprising:
at least two simulated fire locations;
for individual simulated fire locations, a dedicated compact pilot and burner apparatus positioned remotely from the simulated fire location,
wherein individual compact pilot and burner apparatuses are configured to include valves to control a flow of fuel to the simulated fire location as well as to provide a pilot flame to the simulated fire location,
wherein individual compact pilot and burner apparatuses have physical dimensions that fit within an envelope of about 24 inches by 24 inches by 24 inches and individual compact pilot and burner apparatuses weigh less than 50 pounds.

32. The prop of Embodiment 31, wherein individual compact pilot and burner apparatuses are interchangeable with one another.

33. The prop of any of Embodiments 31-32, wherein individual compact pilot and burner apparatuses are removable from the fire training prop.

34. The prop of Embodiment 33, wherein removing a pilot and burner apparatus comprises disengaging a mechanical fastener, disconnecting an electrical cable, disconnecting a fuel source, and disconnecting a fuel outlet conduit.

35. A compact pilot and burner apparatus comprising:
a main fuel system configured to control a flow of fuel within the pilot and burner apparatus;
a pilot fuel system fluidly coupled to the main fuel system and configured to control a flow of fuel within the pilot fuel system;
a pilot flame system fluidly coupled to the pilot fuel system, the pilot flame system configured to generate a pilot flame using the flow of fuel within the pilot fuel system;
an electrical control system configured to transmit electrical signals to the main fuel system, the pilot fuel system, and the pilot flame system; and
a support structure configured to directly or indirectly provide mechanical support for the main fuel system, the pilot fuel system, the pilot flame system, and the electrical control system,
wherein the compact pilot and burner apparatus fits within a physical envelope of about 24 inches by 24 inches by 24 inches.

36. The compact pilot and burner apparatus of Embodiment 35, wherein the apparatus weighs at least about 25 pounds and less than or equal to about 50 pounds.

37. The compact pilot and burner apparatus of any of Embodiments 35-36, wherein the apparatus is configured to be removed from a training structure by disconnecting a single electronic controller plug, disengaging two mechanical fasteners, and disconnecting two gas conduits.

38. The compact pilot and burner apparatus of any of Embodiments 35-37, wherein the apparatus can be installed in and removed from a training structure by one individual.

CONCLUSION

Examples of pilot and burner apparatuses and systems for use firefighting training have been described with reference to the figures. The representations in the figures have been presented to clearly illustrate principles described herein, and details regarding components of the systems and apparatuses have been provided for ease of description rather than attempting to delineate separate physical elements. The examples and figures are intended to illustrate and not to limit the scope of the embodiments described herein. For example, the principles herein may be applied to pilot and burner apparatuses used in other emergency services training, including disaster relief training, first response training, emergency medical training, and the like.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z each to be present.

As used herein, the term "processor" or "controller" refers broadly to any suitable device, logical block, module, circuit, or combination of elements for executing instructions. For example, a controller can include any conventional general purpose single- or multi-chip microprocessor such as a Pentium® processor, a MIPS® processor, a Power PC® processor, AMD® processor, ARM® processor, or an ALPHA® processor. In addition, the controller can include any conventional special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. The controller can be implemented as a combination of computing devices, e.g., a combination of a DSP and a microprocessor, a plurality of microprocessors, one or more microprocessors in conjunction with a DSP core, or any other such configuration.

Data storage can refer to electronic circuitry that allows information, typically computer or digital data, to be stored and retrieved. Data storage can refer to external devices or systems, for example, disk drives or solid state drives. Data storage can also refer to fast semiconductor storage (chips), for example, Random Access Memory (RAM) or various forms of Read Only Memory (ROM), which are directly connected to the communication bus or the controller. Other types of memory include bubble memory and core memory. Data storage can be physical hardware configured to store information in a non-transitory medium.

It should be appreciated that many variations and modifications may be made to the embodiments described herein, the elements of which are to be understood as being among other acceptable examples. All such modifications and variations are intended to be included herein within the scope of this disclosure and protected by the following claims. Further, nothing in the foregoing disclosure is intended to imply that any particular component, characteristic or process step is necessary or essential.

It should also be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

What is claimed is:

1. An integrated pilot and burner apparatus for use in firefighting training, the apparatus comprising:
   a main fuel conduit comprising a main fuel inlet and a main fuel outlet, said main fuel conduit having a pilot fuel opening in fluid communication with a pilot fuel conduit;
   a main fuel valve coupled to the main fuel conduit and configured to control a flow of fuel in the main fuel conduit between the main fuel inlet and the main fuel outlet;
   a pilot flame tube comprising a pilot outlet and an air inlet, said pilot flame tube having a pilot fuel opening in fluid communication with said pilot fuel conduit, wherein the pilot fuel opening is disposed between the main fuel valve and the main fuel inlet;
   said pilot fuel conduit comprising:
      a pilot fuel inlet fluidly coupled to the pilot fuel opening of the main fuel conduit so that, in use, at least a portion of the flow of fuel in the main fuel conduit is directed into the pilot fuel conduit; and
      a pilot fuel outlet fluidly coupled to the pilot fuel opening of the pilot flame tube so that, in use, at least a portion of a flow of fuel in the pilot fuel conduit is directed into the pilot flame tube;
   a pilot fuel valve coupled to the pilot fuel conduit and positioned between the pilot fuel inlet and the pilot fuel outlet, the pilot fuel valve being movable between an open position that permits fuel to flow through the pilot fuel valve and a closed position that prevents fuel to flow through the pilot fuel valve, the pilot fuel valve configured to control the flow of fuel in the pilot fuel conduit between the pilot fuel inlet and the pilot fuel outlet.

2. The integrated pilot and burner apparatus of claim 1 further comprising a pilot regulator coupled to the pilot fuel conduit, the pilot regulator configured to regulate a fuel pressure in the pilot fuel conduit.

3. The integrated pilot and burner apparatus of claim 1, wherein the integrated pilot and burner apparatus weighs less than or equal to 50 pounds.

4. The integrated pilot and burner apparatus of claim 1 further comprising a secondary main fuel valve positioned between the main fuel valve and the main fuel outlet.

5. The integrated pilot and burner apparatus of claim 1 further comprising a secondary pilot fuel valve positioned between the pilot fuel valve and the pilot fuel outlet.

6. The integrated pilot and burner apparatus of claim 1, further comprising:
   an ignition component in communication with the pilot flame tube so that, in use, the ignition component ignites fuel in the pilot tube, wherein the ignition component comprises:
      an ignition coil; and
      a flame igniter,
   wherein the ignition coil is electrically coupled to the flame igniter, and
   wherein when the flame igniter receives electric current from the ignition coil a spark is generated to ignite fuel in the pilot flame tube.

7. The integrated pilot and burner apparatus of claim 6 further comprising a support structure configured to couple to one or more of the pilot flame tube, the main fuel conduit, and the pilot fuel conduit.

8. The integrated pilot and burner apparatus of claim 7 further comprising an electrical enclosure coupled to the support structure.

9. The integrated pilot and burner apparatus of claim 8, wherein the ignition component comprises an ignition coil electrically coupled to a flame igniter, the ignition component positioned within the electrical enclosure.

10. The integrated pilot and burner apparatus of claim 1, further comprising:
   a flame detection component mechanically coupled to the pilot flame tube so that, in use, the flame detection system generates electronic measurements corresponding to flame conditions within the pilot flame tube, including
   an optical sensor configured to generate electrical signals corresponding to levels of electromagnetic radiation within the pilot flame tube.

11. The integrated pilot and burner apparatus of claim 10, wherein the optical sensor comprises an ultraviolet sensor configured to generate electrical signals corresponding to levels of ultraviolet radiation within the pilot flame tube.

12. The integrated pilot and burner apparatus of claim 1, further comprising a flame control system configured to move the pilot fuel valve between the open position and the closed position.

13. A fire training prop comprising non-flammable materials, the prop comprising:
   at least two simulated fire locations;
   for individual simulated fire locations, a dedicated compact pilot and burner apparatus positioned remotely from the simulated fire location,
   wherein individual compact pilot and burner apparatuses are configured to include valves to control a flow of fuel to the simulated fire location as well as to provide a pilot flame to the simulated fire location,
   wherein at least one of the individual compact pilot comprises:
      a main fuel conduit comprising a main fuel inlet and a main fuel outlet, said main fuel conduit having a pilot fuel opening in fluid communication with a pilot fuel conduit;
      a main fuel valve coupled to the main fuel conduit and configured to control a flow of fuel in the main fuel conduit between the main fuel inlet and the main fuel outlet, the pilot fuel opening disposed between the main fuel valve and the main fuel inlet; and
      a pilot fuel valve coupled to a pilot fuel conduit, the pilot fuel valve positioned between a pilot fuel inlet and a pilot fuel outlet of the pilot fuel conduit, the pilot fuel conduit being fluidically connected to the pilot fuel opening, the pilot fuel valve being movable between an open position that permits fuel to flow through the pilot fuel valve and a closed position that prevents fuel to flow through the pilot fuel valve, the pilot fuel valve configured to control the flow of fuel in the pilot fuel conduit between the pilot fuel inlet and the pilot fuel outlet;

wherein individual compact pilot and burner apparatuses can be removed from the fire training prop in less than 10 minutes, wherein individual compact pilot and burner apparatuses have physical dimensions that fit within an envelope of about 24 inches by 24 inches by 24 inches and individual compact pilot and burner apparatuses weigh less than 50 pounds.

14. The prop of claim 13, wherein individual compact pilot and burner apparatuses are interchangeable with one another.

15. The prop of claim 13, wherein individual compact pilot and burner apparatuses are removable from the fire training prop without the use of tools.

16. The prop of claim 15, wherein removing a pilot and burner apparatus comprises disengaging a mechanical fastener, disconnecting an electrical cable, disconnecting a fuel source, and disconnecting a fuel outlet conduit.

17. A compact pilot and burner apparatus comprising:
a main fuel system configured to control a flow of fuel within the pilot and burner apparatus, the main fuel system comprising a main fuel conduit comprising a main fuel inlet and a main fuel outlet, a main fuel valve coupled to the main fuel conduit and configured to control a flow of fuel through the main fuel conduit, said main fuel conduit having a pilot fuel opening disposed between the main fuel valve and the main fuel inlet;
a pilot fuel system fluidly coupled to the main fuel system through the pilot fuel opening, the pilot fuel system comprising a pilot fuel valve movable between an open position that permits fuel to flow through the pilot fuel valve and a closed position that prevents fuel to flow through the pilot fuel valve, the pilot fuel valve configured to control the flow of fuel in the pilot fuel system;
a pilot flame system fluidly coupled to the pilot fuel system, the pilot flame system configured to generate a pilot flame using the flow of fuel within the pilot fuel system;
an electrical control system configured to transmit electrical signals to the main fuel system, the pilot fuel system, and the pilot flame system; and
a support structure configured to directly or indirectly provide mechanical support for the main fuel system, the pilot fuel system, the pilot flame system, and the electrical control system,
wherein the compact pilot and burner apparatus fits within a physical envelope of about 24 inches by 24 inches by 24 inches.

18. The compact pilot and burner apparatus of claim 17, wherein the apparatus weighs at least about 25 pounds and less than or equal to about 50 pounds.

19. The compact pilot and burner apparatus of claim 17, wherein the apparatus is configured to be removed from a training structure by disconnecting a single electronic controller plug, disengaging two mechanical fasteners, and disconnecting two gas conduits.

20. The compact pilot and burner apparatus of claim 17, wherein the apparatus can be installed in and removed from a training structure by one individual.

* * * * *